US010922601B2

(12) United States Patent
Herslow et al.

(10) Patent No.: US 10,922,601 B2
(45) Date of Patent: Feb. 16, 2021

(54) TRANSACTION AND ID CARDS HAVING SELECTED TEXTURE AND COLORING

(71) Applicant: COMPOSECURE, LLC, Somerset, NJ (US)

(72) Inventors: John Herslow, Scotch Plains, NJ (US); Adam Lowe, Hillsborough, NJ (US); Luis Dasilva, Bridgewater, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

(21) Appl. No.: 14/718,596

(22) Filed: May 21, 2015

(65) Prior Publication Data

US 2015/0339564 A1 Nov. 26, 2015

Related U.S. Application Data

(60) Provisional application No. 62/001,706, filed on May 22, 2014, provisional application No. 62/074,305, filed on Nov. 3, 2014.

(51) Int. Cl.
*G06K 19/077* (2006.01)
*B32B 7/12* (2006.01)
(Continued)

(52) U.S. Cl.
CPC .......... *G06K 19/07722* (2013.01); *B32B 3/04* (2013.01); *B32B 3/08* (2013.01);
(Continued)

(58) Field of Classification Search
CPC ... B32B 15/20; B32B 21/14; B32B 2264/108; B32B 2307/402; B32B 2307/584;
(Continued)

(56) References Cited

U.S. PATENT DOCUMENTS 1,601,287 A 9/1926 Bertinetti
2,123,612 A 7/1938 Obert
(Continued)

FOREIGN PATENT DOCUMENTS

CN 1172141 A 2/1998
CN 1234888 A 11/1999
(Continued)

OTHER PUBLICATIONS

International Preliminary Report on Patentability for International Application No. PCT/US2015/058820, dated May 9, 2017, 8 pages.
(Continued)

*Primary Examiner* — Thien M Le
*Assistant Examiner* — Asifa Habib
(74) *Attorney, Agent, or Firm* — RatnerPrestia

(57) ABSTRACT

Cards made in accordance with the invention include a specially treated thin decorative layer attached to a thick core layer of metal or ceramic material, where the thin decorative layer is designed to provide selected color(s) and/or selected texture(s) to a surface of the metal cards. Decorative layers for use in practicing the invention include: (a) an anodized metal layer; or (b) a layer of material derived from plant or animal matter (e.g., wood, leather); or (c) an assortment of aggregate binder material (e.g., cement, mortar, epoxies) mixed with laser reactive materials (e.g., finely divided carbon); or (d) a ceramic layer; and (e) a layer of crystal fabric material. The cards may be dual interface smart cards which can be read in a contactless manner and/or via contacts.

33 Claims, 17 Drawing Sheets

(51) Int. Cl.
| | |
|---|---|
| B32B 9/04 | (2006.01) |
| B32B 13/04 | (2006.01) |
| B32B 13/06 | (2006.01) |
| B32B 13/12 | (2006.01) |
| B32B 15/04 | (2006.01) |
| B32B 15/08 | (2006.01) |
| B32B 15/10 | (2006.01) |
| B32B 15/14 | (2006.01) |
| B32B 21/08 | (2006.01) |
| B32B 21/14 | (2006.01) |
| B32B 27/08 | (2006.01) |
| B32B 27/12 | (2006.01) |
| B32B 27/36 | (2006.01) |
| B32B 3/04 | (2006.01) |
| B32B 3/08 | (2006.01) |
| C25D 5/02 | (2006.01) |
| C25D 11/04 | (2006.01) |
| C25D 11/18 | (2006.01) |
| C25D 11/24 | (2006.01) |
| C25D 11/26 | (2006.01) |
| C25D 11/34 | (2006.01) |
| G06K 19/02 | (2006.01) |
| B32B 33/00 | (2006.01) |
| B32B 21/00 | (2006.01) |
| B32B 9/00 | (2006.01) |
| B32B 21/04 | (2006.01) |
| B32B 3/14 | (2006.01) |
| B32B 3/30 | (2006.01) |
| B32B 9/02 | (2006.01) |
| B32B 15/20 | (2006.01) |
| B32B 27/38 | (2006.01) |
| B32B 37/12 | (2006.01) |
| B32B 37/18 | (2006.01) |
| B32B 38/06 | (2006.01) |
| B32B 38/10 | (2006.01) |
| B32B 38/14 | (2006.01) |
| B32B 38/00 | (2006.01) |
| C25D 3/46 | (2006.01) |
| C25D 3/48 | (2006.01) |
| C25D 3/50 | (2006.01) |
| C25D 7/00 | (2006.01) |
| B32B 27/18 | (2006.01) |

(52) U.S. Cl.
CPC ............... *B32B 3/14* (2013.01); *B32B 3/30* (2013.01); *B32B 7/12* (2013.01); *B32B 9/00* (2013.01); *B32B 9/005* (2013.01); *B32B 9/02* (2013.01); *B32B 9/025* (2013.01); *B32B 9/04* (2013.01); *B32B 9/041* (2013.01); *B32B 9/042* (2013.01); *B32B 9/045* (2013.01); *B32B 9/047* (2013.01); *B32B 13/04* (2013.01); *B32B 13/06* (2013.01); *B32B 13/12* (2013.01); *B32B 15/04* (2013.01); *B32B 15/043* (2013.01); *B32B 15/08* (2013.01); *B32B 15/10* (2013.01); *B32B 15/14* (2013.01); *B32B 15/20* (2013.01); *B32B 21/00* (2013.01); *B32B 21/04* (2013.01); *B32B 21/08* (2013.01); *B32B 21/14* (2013.01); *B32B 27/08* (2013.01); *B32B 27/12* (2013.01); *B32B 27/36* (2013.01); *B32B 27/38* (2013.01); *B32B 33/00* (2013.01); *B32B 37/12* (2013.01); *B32B 37/18* (2013.01); *B32B 38/06* (2013.01); *B32B 38/10* (2013.01); *B32B 38/14* (2013.01); *B32B 38/145* (2013.01); *C25D 3/46* (2013.01); *C25D 3/48* (2013.01); *C25D 3/50* (2013.01); *C25D 5/022* (2013.01); *C25D 7/00* (2013.01); *C25D 11/04* (2013.01); *C25D 11/18* (2013.01); *C25D 11/243* (2013.01); *C25D 11/26* (2013.01); *C25D 11/34* (2013.01); *G06K 19/02* (2013.01); *G06K 19/022* (2013.01); *B32B 27/18* (2013.01); *B32B 38/0012* (2013.01); *B32B 38/105* (2013.01); *B32B 2038/0016* (2013.01); *B32B 2250/03* (2013.01); *B32B 2250/04* (2013.01); *B32B 2255/00* (2013.01); *B32B 2255/06* (2013.01); *B32B 2255/08* (2013.01); *B32B 2255/10* (2013.01); *B32B 2255/20* (2013.01); *B32B 2255/205* (2013.01); *B32B 2264/108* (2013.01); *B32B 2307/40* (2013.01); *B32B 2307/402* (2013.01); *B32B 2307/584* (2013.01); *B32B 2307/732* (2013.01); *B32B 2311/24* (2013.01); *B32B 2313/04* (2013.01); *B32B 2315/02* (2013.01); *B32B 2317/08* (2013.01); *B32B 2317/16* (2013.01); *B32B 2363/00* (2013.01); *B32B 2425/00* (2013.01); *C25D 11/246* (2013.01); *Y10T 29/49004* (2015.01); *Y10T 29/49828* (2015.01); *Y10T 156/10* (2015.01); *Y10T 156/1039* (2015.01); *Y10T 156/1082* (2015.01)

(58) Field of Classification Search
CPC ............. B32B 2311/24; B32B 2313/04; B32B 2315/02; B32B 2317/08; B32B 2317/16; B32B 2363/00; B32B 2425/00; B32B 27/08; B32B 27/36; B32B 27/38; B32B 37/12

See application file for complete search history.

(56) References Cited

U.S. PATENT DOCUMENTS

| | | | |
|---|---|---|---|
| 2,205,466 | A | 6/1940 | Caprio et al. |
| 4,278,377 | A | 7/1981 | Elineau |
| 4,354,851 | A | 10/1982 | Hix et al. |
| 4,499,126 | A | 2/1985 | Suzuki et al. |
| 4,692,394 | A | 9/1987 | Drexler |
| 4,711,690 | A | 12/1987 | Haghiri-Tehrani |
| 4,856,857 | A | 8/1989 | Takeuchi et al. |
| 4,971,646 | A | 11/1990 | Schell et al. |
| 5,045,511 | A | 9/1991 | Bosomworth et al. |
| 5,173,133 | A | 12/1992 | Morin et al. |
| 5,292,616 | A | 3/1994 | Fujita et al. |
| 5,526,664 | A | 6/1996 | Vetter |
| 5,549,953 | A | 8/1996 | Li |
| 5,574,309 | A | 11/1996 | Papapietro et al. |
| 5,702,666 | A | 12/1997 | Hatakeyama et al. |
| 5,804,285 | A | 9/1998 | Kobayashi et al. |
| 5,843,599 | A | 12/1998 | Paz-Pujalt et al. |
| 5,892,661 | A | 4/1999 | Stafford et al. |
| 6,066,437 | A | 5/2000 | Kösslinger |
| 6,158,663 | A | 12/2000 | Ochiai |
| 6,198,155 | B1 | 3/2001 | Verhaegh et al. |
| 6,214,155 | B1 | 4/2001 | Leighton |
| 6,364,983 | B1 | 4/2002 | Kay |
| 6,478,228 | B1 | 11/2002 | Ikefuji et al. |
| 6,581,839 | B1 | 6/2003 | Lasch et al. |
| 6,589,642 | B1 | 7/2003 | Miller et al. |
| 6,607,135 | B1 | 8/2003 | Hirai et al. |
| 6,644,552 | B1 | 11/2003 | Herslow |
| 6,764,005 | B2 | 7/2004 | Cooper |
| 6,853,286 | B2 | 2/2005 | Nikawa et al. |
| 6,857,569 | B1 * | 2/2005 | Smith, Sr. ............. G06K 7/084 235/449 |
| 7,022,202 | B2 | 4/2006 | Goertzen |
| 7,029,547 | B2 | 4/2006 | Biller |
| 7,063,924 | B2 | 6/2006 | Kaminsky et al. |
| 7,134,603 | B2 | 11/2006 | Batoha |
| 7,287,704 | B2 | 10/2007 | Herslow |
| D573,182 | S | 7/2008 | Ricketts et al. |

(56) References Cited

U.S. PATENT DOCUMENTS

| | | | |
|---|---|---|---|
| 7,398,917 B2 | 7/2008 | Aibazov et al. | |
| 7,494,057 B2 | 2/2009 | Lasch et al. | |
| 7,503,503 B2 | 3/2009 | Riedl et al. | |
| 7,530,491 B2 | 5/2009 | Lasch et al. | |
| 7,544,266 B2 | 6/2009 | Herring et al. | |
| 7,588,184 B2 | 9/2009 | Gandel et al. | |
| 7,757,957 B2 | 7/2010 | Cranston et al. | |
| 7,763,179 B2* | 7/2010 | Levy | B41M 5/24 |
| | | | 216/94 |
| 7,823,777 B2 | 11/2010 | Varga et al. | |
| D632,735 S | 2/2011 | McGrane et al. | |
| 7,909,258 B2 | 3/2011 | Kim | |
| 8,033,457 B2 | 10/2011 | Varga et al. | |
| 8,087,698 B2 | 1/2012 | Jones et al. | |
| 8,356,757 B2 | 1/2013 | Sonoda et al. | |
| 8,397,998 B1 | 3/2013 | Mann et al. | |
| D687,886 S | 8/2013 | Ahrabian | |
| 8,579,201 B2 | 11/2013 | Akesson | |
| 8,672,232 B2 | 3/2014 | Herslow | |
| 8,725,589 B1 | 5/2014 | Skelding et al. | |
| 8,752,277 B2 | 6/2014 | Orihara et al. | |
| 8,755,121 B2* | 6/2014 | Cape | B42D 25/41 |
| | | | 359/619 |
| 8,944,810 B2 | 2/2015 | Herslow | |
| 9,016,591 B2 | 4/2015 | Herslow et al. | |
| 9,070,053 B2 | 6/2015 | Mosteller | |
| 9,300,251 B2 | 3/2016 | Khitun et al. | |
| 9,327,484 B2 | 5/2016 | Herring et al. | |
| 9,390,363 B1 | 7/2016 | Herslow et al. | |
| 9,390,366 B1 | 7/2016 | Herslow et al. | |
| 9,542,635 B2 | 1/2017 | Herslow | |
| 9,569,718 B2 | 2/2017 | Herslow | |
| 10,399,905 B2 | 9/2019 | Ketcham et al. | |
| 2001/0049004 A1 | 12/2001 | Wilkie | |
| 2002/0007906 A1 | 1/2002 | Droz | |
| 2002/0096569 A1 | 7/2002 | Boutaghou et al. | |
| 2003/0038174 A1* | 2/2003 | Jones | G06K 19/07728 |
| | | | 235/380 |
| 2003/0065938 A1 | 4/2003 | Kitamura et al. | |
| 2003/0136848 A1 | 7/2003 | Kiekhaefer | |
| 2003/0223616 A1 | 12/2003 | D'Amato et al. | |
| 2003/0234286 A1* | 12/2003 | Labrec | C08K 3/16 |
| | | | 235/380 |
| 2004/0031855 A1 | 2/2004 | Takahashi | |
| 2004/0131756 A1 | 7/2004 | Skierski et al. | |
| 2004/0217178 A1* | 11/2004 | Lasch | G06K 19/02 |
| | | | 235/488 |
| 2005/0003297 A1 | 1/2005 | Labrec | |
| 2005/0040243 A1 | 2/2005 | Bi et al. | |
| 2005/0095408 A1 | 5/2005 | LaBrec et al. | |
| 2005/0242194 A1 | 11/2005 | Jones et al. | |
| 2006/0102729 A1 | 5/2006 | Gandel et al. | |
| 2007/0089831 A1 | 4/2007 | Fiorentino et al. | |
| 2008/0129037 A1 | 6/2008 | Roth et al. | |
| 2008/0164307 A1* | 7/2008 | Silverstein | G07F 17/16 |
| | | | 235/380 |
| 2008/0166482 A1 | 7/2008 | Frye et al. | |
| 2008/0274225 A1 | 11/2008 | Bharadwai et al. | |
| 2008/0296887 A1 | 12/2008 | Baggenstos | |
| 2008/0309064 A1 | 12/2008 | Herlin et al. | |
| 2009/0020523 A1 | 1/2009 | DeMichael et al. | |
| 2009/0032602 A1 | 2/2009 | Nishi et al. | |
| 2009/0169776 A1 | 7/2009 | Herslow | |
| 2009/0179817 A1 | 7/2009 | Yin | |
| 2009/0213149 A1* | 8/2009 | Barton | B41M 5/24 |
| | | | 346/135.1 |
| 2009/0218401 A1* | 9/2009 | Moran | G09F 3/10 |
| | | | 235/439 |
| 2009/0294543 A1 | 12/2009 | Varga et al. | |
| 2009/0314424 A1 | 12/2009 | Herring et al. | |
| 2009/0315316 A1* | 12/2009 | Staub | B42D 25/00 |
| | | | 283/72 |
| 2010/0021740 A1 | 1/2010 | Tanaka et al. | |
| 2010/0059266 A1 | 3/2010 | Yoo et al. | |
| 2010/0068395 A1* | 3/2010 | Moriya | C23C 16/4404 |
| | | | 427/343 |
| 2010/0116891 A1 | 5/2010 | Yano et al. | |
| 2010/0224959 A1 | 9/2010 | Scherabon et al. | |
| 2010/0230154 A1 | 9/2010 | Naito et al. | |
| 2010/0276497 A1 | 11/2010 | Seban et al. | |
| 2011/0020606 A1 | 1/2011 | Herslow et al. | |
| 2011/0031319 A1 | 2/2011 | Kiekhaefer et al. | |
| 2011/0079344 A1* | 4/2011 | Sheu | H05K 3/048 |
| | | | 156/151 |
| 2011/0101113 A1 | 5/2011 | Konjima et al. | |
| 2011/0226858 A1 | 9/2011 | Lasch et al. | |
| 2011/0309146 A1 | 12/2011 | Lazzu et al. | |
| 2012/0208030 A1 | 8/2012 | Audenaert | |
| 2012/0270019 A1* | 10/2012 | Wachter | B32B 15/09 |
| | | | 428/195.1 |
| 2012/0325914 A1 | 12/2012 | Herslow | |
| 2013/0008796 A1 | 1/2013 | Silverman et al. | |
| 2013/0033407 A1 | 2/2013 | Chae et al. | |
| 2013/0067842 A1 | 3/2013 | Meersseman et al. | |
| 2013/0119147 A1 | 5/2013 | Varga et al. | |
| 2013/0126622 A1 | 5/2013 | Finn | |
| 2013/0248607 A1 | 9/2013 | Zlotnik | |
| 2013/0287267 A1 | 10/2013 | Varone | |
| 2014/0144993 A1 | 5/2014 | Seo et al. | |
| 2014/0224881 A1 | 8/2014 | Herslow | |
| 2015/0115039 A1 | 4/2015 | Mosteller | |
| 2015/0136856 A1 | 5/2015 | Herslow et al. | |
| 2015/0180229 A1 | 6/2015 | Herslow | |
| 2015/0206047 A1 | 7/2015 | Herslow et al. | |
| 2015/0236235 A1* | 8/2015 | Ladizinsky | H01L 27/18 |
| | | | 505/190 |
| 2015/0298429 A1 | 10/2015 | Ricketts et al. | |
| 2015/0339564 A1 | 11/2015 | Herslow et al. | |
| 2016/0042268 A1 | 2/2016 | Puttkammer | |
| 2016/0110639 A1 | 4/2016 | Finn et al. | |
| 2016/0180212 A1 | 6/2016 | Herslow et al. | |
| 2016/0232438 A1 | 8/2016 | Williams et al. | |
| 2016/0357062 A1* | 12/2016 | Li | G02B 27/286 |
| 2017/0017871 A1 | 1/2017 | Finn et al. | |
| 2017/0077589 A1 | 3/2017 | Finn et al. | |
| 2017/0098151 A1 | 4/2017 | Herslow et al. | |
| 2017/0185885 A1* | 6/2017 | Skelding | G06K 19/07711 |
| 2018/0269352 A1* | 9/2018 | Tian | H01L 33/0095 |
| 2019/0233655 A1* | 8/2019 | Kimpel | C09D 151/08 |
| 2019/0324574 A1* | 10/2019 | Schooley | G06F 1/3265 |
| 2020/0082396 A1* | 3/2020 | Chow | G06K 19/045 |

FOREIGN PATENT DOCUMENTS

| | | |
|---|---|---|
| CN | 1241969 A | 1/2000 |
| CN | 2521676 Y | 11/2002 |
| CN | 102263327 A | 11/2011 |
| DE | 4131617 A1 | 4/1992 |
| EP | 0559115 A1 | 9/1993 |
| EP | 2405311 A1 | 1/2012 |
| JP | 0615993 A | 1/1994 |
| JP | 07155970 A | 6/1995 |
| JP | 2002189433 A | 7/2002 |
| JP | 2002370457 A | 12/2002 |
| JP | 2004025546 A | 1/2004 |
| JP | 2004265176 A | 9/2004 |
| JP | 2007128393 A | 5/2007 |
| JP | 3144889 U | 9/2008 |
| JP | 2009096027 A | 5/2009 |
| JP | 2011521377 A | 7/2011 |
| JP | 2012018324 A | 1/2012 |
| KR | 20100066148 A | 6/2010 |
| KR | 20130006358 A | 1/2013 |
| KR | 101699412 B1 | 1/2017 |
| WO | 2004063977 A2 | 7/2004 |
| WO | 2006081385 A1 | 8/2006 |
| WO | 2012121494 A2 | 9/2012 |

(56) References Cited

FOREIGN PATENT DOCUMENTS

| WO | 2015179639 A1 | 11/2015 |
| WO | 2016073473 A1 | 5/2016 |

OTHER PUBLICATIONS

International Search Report and Written Opinion of the International Searching Authority for International Application No. PCT/US2015/058820, dated Feb. 19, 2016, 11 pages. 2016.
Extended European Search Report for European Application No. 15796355.4, dated Nov. 13, 2017, 8 pages.
Singapore Written Opinion for Singapore Application No. 11201609690Y, dated Jul. 13, 2017, 8 pages.
International Search Report and Written Opinion of the International Searching Authority for International Application No. PCT/US2015/031971, dated Sep. 30, 2015, 20 pages.
New Zealand Examination Report for New Zealand Appliction No. 726408, dated Sep. 25, 2017, 15 pages.
Entire patent prosecution history of U.S. Appl. No. 15/521,519, filed Apr. 24, 2017, entitled "Ceramic-Containing and Ceramic Composite Transaction Cards".
Entire patent prosecution history for U.S. Appl. No. 15/379,569, filed Dec. 15, 2016, entitled "Transaction and ID Cards Having Selected Texture and Coloring".
Entire patent prosecution history for U.S. Appl. No. 12/460,829, filed Jul. 24, 2009, entitled "Card With Embedded Image".
Entire patent prosecution history for U.S. Appl. No. 14/977,553, filed Dec. 21, 2015, entitled "Smart Metal Card With Radio Frequency (RF) Transmission Capability".
Entire patent prosecution history for U.S. Appl. No. 14/178,436, filed Feb. 12, 2014 entitled "Durable Card".
Entire patent prosecution history for U.S. Appl. No. 15/637,092, filed Jun. 29, 2017, entitled "Durable Card".
Entire patent prosecution history for U.S. Appl. No. 12/006,168, filed Dec. 31, 2007, entitled "Foil Composite Card", now U.S. Pat. No. 9,542,635, issued Jan. 10, 2017.
Entire patent proscution hisotry for U.S. Appl. No. 15/355,018, filed Nov. 17, 2016, entitled "Foil Composite Card".
Entire patent prosecution history for U.S. Appl. No. 15/356,586, filed Nov. 19, 2016, entitled "Foil Composite Card".
Entire patent prosecution history for U.S. Appl. No. 14/183,868, filed Feb. 19, 2014, entitled "Foil Composite Card".
New Zealand Examination Report for New Zealand Application No. 726408, dated Mar. 1, 2018, 5 pages.
Australian Examination Report for Australian Application No. 2015264126, dated Jan. 31, 2018, 4 pages.
Non Final Office Action for U.S. Appl. No. 15/521,519, dated Feb. 9, 2018, 32 pages.
Written Opinion for Singapore Application No. 11201703216R, dated Jan. 16, 2018, 5 pages.
European Communication Pursuant to Article 94(3) for European Application No. 15796355.4, dated Aug. 2, 2018, 4 pages.
New Zealand Examination Report for New Zealand Application No. 726408, dated Jul. 20, 2018, 5 pages.
Notice of Reasons for rejection for Japanese Application No. 2017-513610, dated Jul. 10, 2018 with translation, 12 pages.
Columbian Office Action for Columbian Application No. NC2017/0004295, dated Aug. 16, 2018 with English language remarks, 20 pages.
New Zealand Examination Report for New Zealand Application No. 726408, dated Aug. 22, 2018, 4 pages.
European Communication and Extended European Search Report for European Application No. 15856207.4, dated Jun. 6, 2018, 9 pages.
Notice of Reasons for Rejection for Japanese Application No. 2017-543283, dated May 8, 2018 with translation, 7 pages.
Non Final Office Action for U.S. Appl. No. 15/379,569, dated May 17, 2018, 46 pages.
Final Office Action for U.S. Appl. No. 15/521,519, dated Jun. 28, 2018, 42 pages.
Final Office Action for U.S. Appl. No. 15/379,569, dated Feb. 20, 2019, 26 pages.
Non Final Office Action for U.S. Appl. No. 15/637,092, dated Nov. 1, 2018, 48 pages.
Non Final Office Action for U.S. Appl. No. 15/521,519 dated Jan. 24, 2019.
Wkipedia.com, Tetraethyl Orthosilicate, downloaded from https://en.wikipedia.org/wikiTetraethyl_orthosilicate, Dec. 21, 2018, 3 pages.
Non Final Office Action for U.S. Appl. No. 15/521,519, dated Jan. 24, 2019, 26 pages.
Japanese Decision of Final Rejection for Japanese Application No. 2017-543283, dated Nov. 20, 2018 with translation, 5 pages.
Chinese Office Action for Chinese Application No. 201580026503.9, dated Nov. 23, 2018. 13 pages.
Columbian Office Action for Columbian Applicant No. NC2017/0004295, dated Dec. 19, 2018, 13 pages.
European Communicatioon for European Application No. 15856207.4, dated Mar. 25, 2019, 5 pages.
Chinese Office Action for Chinese Application No. 201580026503.9, dated Jun. 21, 2019 with translation, 18 pages.
Japanese Decision of Final Rejection for Japanese Application No. 2017-513610, dated May 28, 2017 with translation, 9 pages.
Chinese Office Action for Chinese Application No. 201580059209.8, dated Jun. 10, 2019 with translation, 30 pages.
Japanese Notice of Reasons for Rejection for Japanese Application No. 2019-003489, dated May 12, 2020 with translation, 16 pages.
Dai Dahuang, "Films and Coatings": Modern Surface Technology, 2008, (English translation and Chinese original), 10 pages.
Chinese Office Action for Chinese Application No. 201580059209.8, dated Feb. 3, 2020 with partial translation, 15 pages.
Notice of Allowance for U.S. Appl. No. 15/379,569, dated Dec. 2, 2019, 33 pages.
Notice of Allowance for U.S. Appl. No. 15/521,519, dated Jan. 2, 2020, 34 pages.
Notice of Reasons for Rejection for Japanese Application No. 2019-045862, dated Oct. 15, 2019, with translation, 8 pages.
Non Final Office Action for U.S. Appl. No. 15/861,321, dated Apr. 17, 2020, 50 pages.
Non Final Office Action for U.S. Appl. No. 15/860,286, dated Apr. 16, 2020, 68 pages.
Non Final Office Action for U.S. Appl. No. 16/452,740, dated Aug. 21, 2020, 31 pages.
Notice of Allowance for U.S. Appl. No. 15/860,286, dated Sep. 4, 2020, 25 pages.
European Communication Pursuant to Article 94(3) for European Application No. 15874266.8, dated Aug. 24, 2020, 4 pages.
European Communication Pursuant to Article 94(3) for European Application No. 15856207.4, dated Sep. 4, 2020, 4 pages.
Japanese Notice of Reasons for Rejection for Japanese Application No. 2017-543283, dated Aug. 25, 2020 with translation, 13 pages.
Final Office Action for U.S. Appl. No. 15/861,321, dated Sep. 16, 2020, 26 pages.
Indian Examination Report for Indian Application No. 20171707017958, dated Oct. 20, 2020 with translation, 7 pages.
Japanese Notice of Reasons for Rejection for Japanese Application No. 2019-173994, dated Oct. 27, 2020 with translation, 9 pages.

* cited by examiner

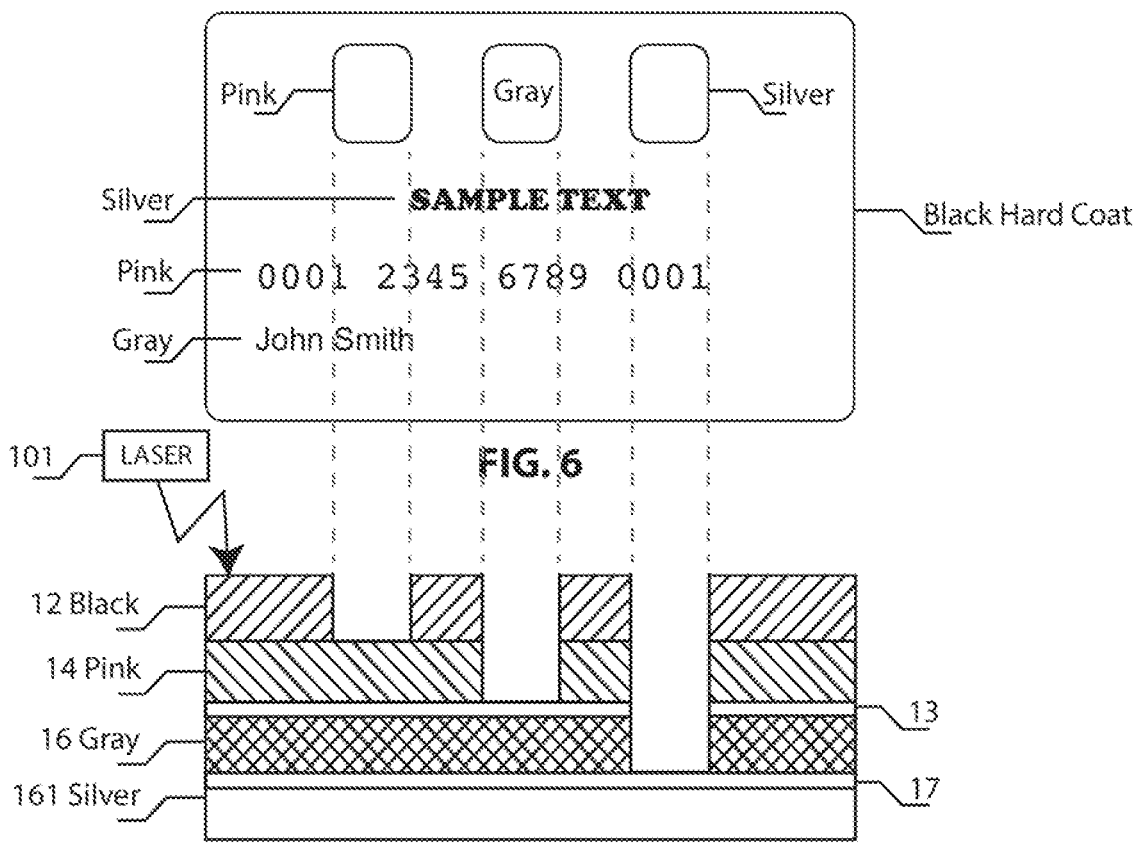
FIG. 6
FIG. 6A
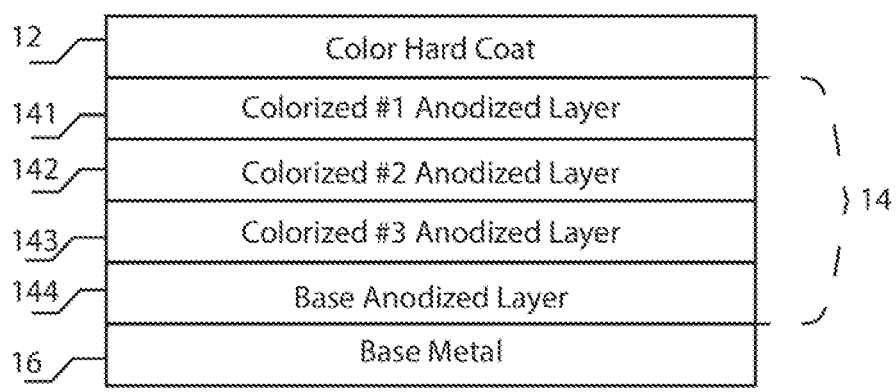
FIG. 6B ure is designed to provide selected color(s) and/or selected
TRANSACTION AND ID CARDS HAVING SELECTED TEXTURE AND COLORING This application claims priority based on a provisional application titled TRANSACTION AND ID CARDS WITH CONTROLLED COLORING bearing Ser. No. 62/001,706 filed May 22, 2014 whose teachings are incorporated herein by reference. This application also claims priority based on a provisional application titled CERAMIC TRANSACTIONAL AND IDENTIFICATION CARDS WITH CONTROLLED COLORING bearing Ser. No. 62/074,305 filed Nov. 3, 2014 whose teachings are incorporated herein by reference.

BACKGROUND OF THE INVENTION

This invention relates to the manufacture of metal cards having varied coloring and texture. In particular, the present invention relates to apparatus and methods for producing transactional and ID cards, or any like document, having a metal layer where the card can be made to have a variety of colors and textures. This invention also relates to cards having a core layer of ceramic material and to metal cards with decorative ceramic layers.

It has become desirable to provide metal or ceramic cards for the high end market to impart a sense of wealth and distinction to the card holder. It is also desirable to provide metal cards with different colors and textures to further enhance eye and touch appeal and/or provide a degree of personalization.

It is known to use physical vapor deposition (PVD) to color metal transaction cards, but PVD is limited in its color range and is also relatively expensive. PVD is also highly dependent upon the substrate upon which it is being deposited. PVD is a vacuum process with high heat and batch operation that is expensive requiring individual racking and turning of parts for even distribution of color. It also subjects the metal to high temperature which can shrink and warp the metal.

In some metal cards, printed PVC layers or other polymers are used to decorate the outside of cards. The use of these polymeric layers has undesirable traits such as minimum print thickness, loss of weight in the metal card due to polymeric thickness, and challenges of lamination of dissimilar materials. Use of different thicknesses and compounds can also cause the parts to warp or bow due to uneven shrinkage during platen lamination.

It is an object of this invention to overcome these and other problems and to enable the manufacture of metal cards and/or ceramic cards having a wide range of colors and textures.

SUMMARY OF THE INVENTION

Cards made in accordance with the invention include a specially treated thin decorative layer attached to either side, or both sides, of a thick core layer of metal, ceramic coated metal or polymer, or solid ceramic material, where the thin decorative layer is designed to provide selected color(s) and/or selected texture(s) to a surface of the cards. Decorative layers for use in practicing the invention include: (a) an anodized metal layer; or (b) a layer of material derived from plant or animal matter (e.g., wood, leather); or (c) an assortment of aggregate binder material (e.g., cement, mortar, epoxies) mixed with laser reactive materials (e.g., finely divided carbon); or (d) a ceramic layer; and (e) a layer of crystal fabric material. The cards may be dual interface smart cards which can be read in a contactless manner and/or via contacts.

The manufacture of metal cards in accordance with the invention includes the preparation and treatment of a generally thin decorative layer and attaching the decorative layer to a thick metal substrate; where the thin decorative layer is designed to provide selected color(s) and/or selected texture(s) primarily to the front surface of the metal cards but also to the back of the cards.

Where the thin decorative layer is an anodized metal layer, the metal layer is prepared and treated to have a selected color for imparting the coloring to the card. Adding color (colorizing) to metal layers by anodizing is preferable to the PVD process for several reasons. Anodizing is an electrochemical process that converts the metal surface into a decorative, durable, corrosion-resistant, anodic oxide finish. Thus, coloring a metal by anodizing is highly desirable. Aluminum is ideally suited to anodizing. However, other nonferrous metals, such as magnesium, titanium, zinc, niobium, tantalum, or any other metal which can be anodized, can be used to practice the invention.

As for aluminum films, for example, the anodic oxide structure originates from the aluminum substrate and is composed entirely of aluminum oxide. This aluminum oxide is not applied to the surface like paint or plating, but is fully integrated with the underlying aluminum substrate, so it cannot chip or peel. It has a highly ordered, porous structure that allows for secondary processes such as coloring and sealing.

Anodizing may be accomplished by immersing the aluminum into an acid electrolyte bath (tank) and passing an electric current through the medium. A cathode is mounted to the inside of the anodizing tank; the aluminum acts as an anode, so that oxygen ions are released from the electrolyte to combine with the aluminum atoms at the surface of the part being anodized. Anodizing is, therefore, a matter of highly controlled oxidation—the enhancement of a naturally occurring phenomenon. Color may be introduced by running the anodized foil through a dye bath of the appropriate (desired) color and then a sealer bath.

Using a colorized anodic layer upon a metal layer provides more flexibility and cost savings. Use of printed anodic material to replace polymeric materials overcomes these challenges since the metal is denser than the polymer and does not have the minimum print thickness limitations. This composition and method may be used on all transaction and ID card types including contactless, contact, and dual interface smart cards.

In accordance with the invention, the color and/or texture of an anodized layer may be further modified by: (a) dying the anodized layer a single color or multiple colors, or (b) by printed graphics through techniques such as screen printing, sublimation printing, or any digital print system. The anodized metal layer may be further modified through techniques such as laser engraving, mechanical engraving, die cutting, or embossing. The anodized metal layer may be used on the card as a full faced material (i.e., extending the full length and width of the card), as a patch, a stripe, or other decorative design. The anodized metal may be laser marked, or otherwise engraved or marked such that base or noble metals may be electroplated to the anodized surface in a selective pattern or flood coat.

In accordance with one aspect of the invention, the imparting of color to multilayered metal cards is achieved using at least one anodized colored metal layer and selectively modifying the other layers, which may or may not be colored, to provide a desired artistic and/or functional effect.

Where the decorative layer is a layer of material derived from plant matter (e.g., wood) special care must be taken to treat the decorative layer to preserve the original (unique) pattern and texture before and during the attachment of the decorative layer to a metal substrate. Texture as used herein refers to the visual and especially tactile quality of a surface. This includes the feel, touch, appearance and graininess of the surface.

Likewise, where the decorative layer is a layer of material derived from animal matter (e.g., leather) special processes were developed to treat the decorative layer to preserve the original (unique) pattern and texture before and during the attachment of the decorative layer to a metal substrate.

Also, where the decorative layer is a layer of material derived from an assortment of aggregate binder material (e.g., cement, mortar, epoxies) mixed with laser reactive materials (e.g., finely divided carbon) special arrangements are made to produce cards with top surfaces having desired color and texture.

Also, various ceramic materials having selected texture and color may be used to form decorative layers attached to a metal substrate.

Thus, the thin decorative layer may be a veneer layer of textured materials which may be natural and/or of a non-metallic nature which are prepared and treated to provide unique and/or selected texture to the card surface.

Cards embodying the invention include a thin decorative layer and a thick core layer of metal, ceramic coated metal, ceramic coated polymer, or solid ceramic material. In addition, the cards may include a number of different polymeric layers. Still further, metal cards embodying the invention may include an integrated circuit chip and antennas for enabling RF transmission of signals between the cards and a card reader. These cards are "smart" cards capable of also functioning as contact cards, and/or dual interface (contact and/or contactless).

Still further, cards embodying the invention may include a pocket formed in the top surface of the card to enable the placement therein of one or more of the decorative layers.

BRIEF DESCRIPTION OF THE DRAWINGS

In the accompanying drawings, which are not drawn to scale, like reference characters denote like components.

FIG. 6 is a top view of a card having four colored layers to form a card in accordance with the invention;

FIG. 6A is a cross sectional diagram of the card shown in FIG. 6;

FIG. 6B is a cross sectional diagram illustrating that an anodized aluminum layer 14 may be formed having multi-colored levels;

DETAILED DESCRIPTION OF THE INVENTION

Metal Cards with at Least One Anodized Layer

Figure 1:
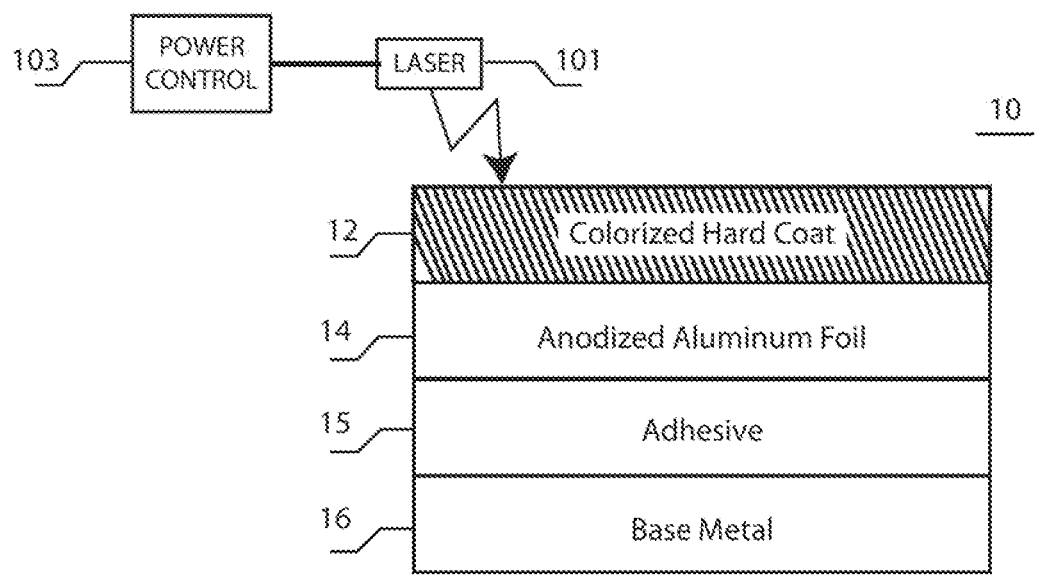
FIG. 1 is a cross sectional diagram of colored layers combined to form a metal card with controlled coloring in accordance with the invention.

FIG. 1 shows one embodiment of a metal based transactional card 10 having a number of different colored layers. In FIG. 1, card 10 includes a colorized hard-coat top layer 12 overlying an anodized aluminum foil layer 14. The hard coat layer 12 may be attached to the anodized layer 14 by any known or suitable manner (e.g., by being bonded, sprayed on and cured, attached via an adhesive or carrier layer, or transferred from a carrier sheet). Layer 14 is attached via an adhesive layer 15 to a base metal layer 16. Layers 12 and 14 are designed to have selected colors which are used to provide the card 10 with a different colored and decorative appearance. The color of layers 12 and 14 may be combined with the color of the base metal layer 16 to provide the card with a still greater range of colors and decorative patterns.

In the manufacture of the cards, the thickness of hard coat layer 12 will typically be 2 to 50 microns, the thickness of aluminum foil layer 14 may be in the range of 0.0005 inches to 0.014 inches, and the thickness of metal layer 16 may be in the range of 0.005 inches to 0.032 inches. Note that layer 12 is optional and that layer 14 is primarily intended to provide a decorative (coloring) function.

Layer 12 provides a scratch resistance surface and can also provide a colored layer. The hard coat layer 12 may be formed of nano-particles, such as silicate nanoparticles, zinc oxide nanoparticles, silicon dioxide crystalline nano-particles, or any other suitable nano-particles with a suitable carrier such as a solvent, water based, or UV curable acrylates, vinyls, urethane or the like. The hard coat can be applied by coating techniques such as spraying, gravure, reverse roll, direct roll, or slot coating.

The hard coat layer 12 may be applied to a card, or to a subassembly used in forming a card, by means of a special carrier layer. The special carrier enables a release layer and a hard coat layer to be attached to the special carrier layer to form a subassembly which can then be attached and transferred to another subassembly to form an intermediate assembly from which the carrier and release layers can be removed, leaving the hard coat layer as the top and/or bottom layer of the card. The hard coat layer may be clear or colored. Color is added to the hard coat layer by adding pigments or dyes to either the adhesive layer or mixed with the hard coat vehicle itself The second layer 14 is comprised of a colored anodic metal layer which is shown to be attached via an adhesive layer 15 to a base metal layer 16. The layer 14 could also be bonded and laminated to the underlying layer 16. The anodized metal layer 14 is shown to be of aluminum. However, the anodized layer 14 may be titanium, zinc, niobium, tantalum or any other metal which can be anodized. In accordance with the invention, an anodized layer may by further modified by: (a) dying the anodized layer a single color or multiple colors, or (b) by printed graphics through techniques such as screen printing, sublimation printing, or any digital print system. The anodized metal layer 14 may be further modified through techniques such as laser engraving, mechanical engraving, die cutting, or embossing. The anodized metal layer may be used on the card as a full faced material (i.e., extending the full length and width of the card), as a patch, a stripe, or other decorative design.

Using a colorized anodic layer 14, instead of a polymer layer, upon a colored metal layer 16 provides more flexibility and cost savings. Use of printed anodic material to replace polymeric materials overcomes the challenges present when using polymers since the metal is denser than the polymer and does not have the minimum print thickness limitations. This composition and method may be used on all transaction and ID card types including contactless, contact, and dual interface smart cards.

The base or substrate metal layer 16 used in cards embodying the invention may be any suitable metal, such as stainless steel, bronze, copper, titanium, or any alloy which gives the card most of its body (structure) and weight.

Figure 1A:
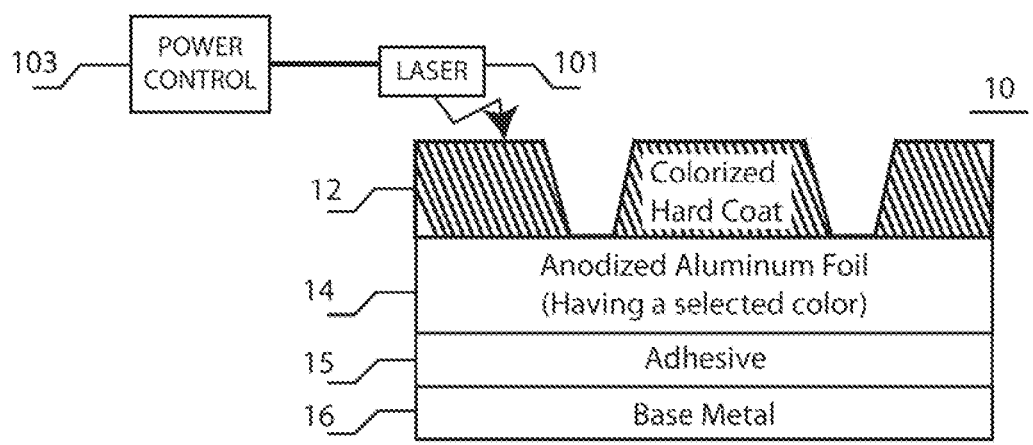
FIG. 1A is a cross sectional diagram illustrating the removal of portions of the top layer of the card shown in FIG. 1 displaying different colors.
Figure 1B:
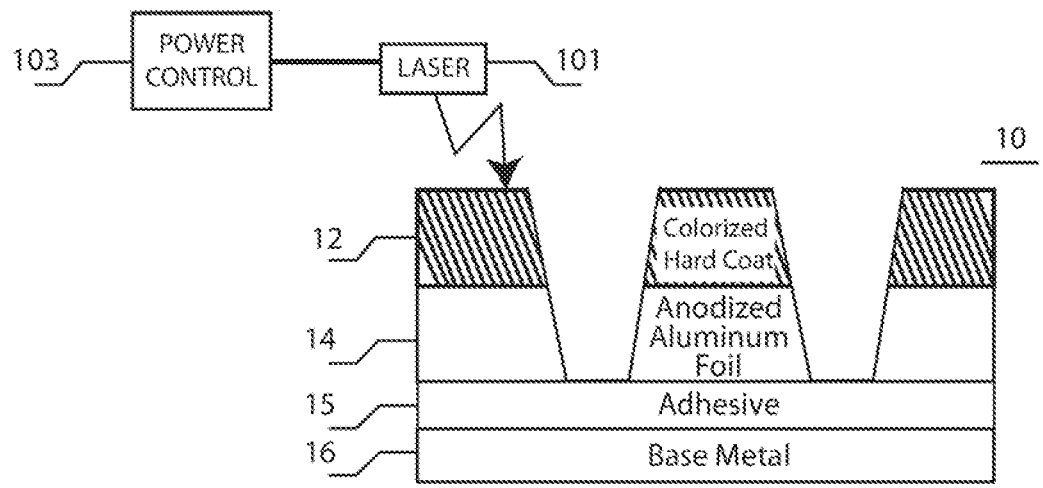
FIG. 1B is a cross sectional diagram illustrating the removal of portions of the two top layers of the card shown in FIG. 1 displaying still more colors.

The layers 12, 14, 15, and 16 may be combined in one or more lamination steps using heat, pressure, and/or UV curing. FIGS. 1, 1A and 1B illustrate the construction of a multi layered metal transaction card where essentially the entire body of the card is metal and whose color can be controlled. A signature panel and a magnetic stripe (not shown) could be attached (directly or indirectly via a polymer layer) to the underside of metal layer 15 shown in FIGS. 1, 1A and 1B to form a complete transaction card.

In FIGS. 1, 1A and 1B there is shown a laser 101 for applying a laser beam to a card 10. The power level of the laser 10 is controlled by a power controller 103. Controlling the power level of the laser enables the manufacture of cards whose colors can be varied and controlled. The laser can be used to ablate selected portions of the hard coat layer 12 and of the anodized layer 14. In addition, the laser can be used to change the color of the base metal layer 16 by controlling (varying) the power level and polarization of the laser (e.g., this may be termed a type of diffraction lasering). In this manner the color and texture of each card may be controlled and varied.

FIG. 1A illustrates that a desirable color contrast may be created by selectively laser ablating or engraving the top layer 12, allowing the $2^{nd}$ layer 14 to show through. This can be achieved with discrete, optimized laser parameters or engraving techniques.

FIG. 1B illustrates that a second set of parameters may be used to remove selected portions of the anodic layer 14, showing the base metal 16 underneath. This allows for a multi-color gradient on the metal card, which may include the base metal finish itself. This aesthetic look is highly desirable in the marketplace.

Note that only a single anodized layer is shown in the drawings. However, more than one (i.e., multiple) anodized suitable metal layers could be used. For example, since there is one anodized layer per piece of Aluminum, multiple aluminum layers could be included.

Hybrid Metal-Polymer Cards

Figure 2:
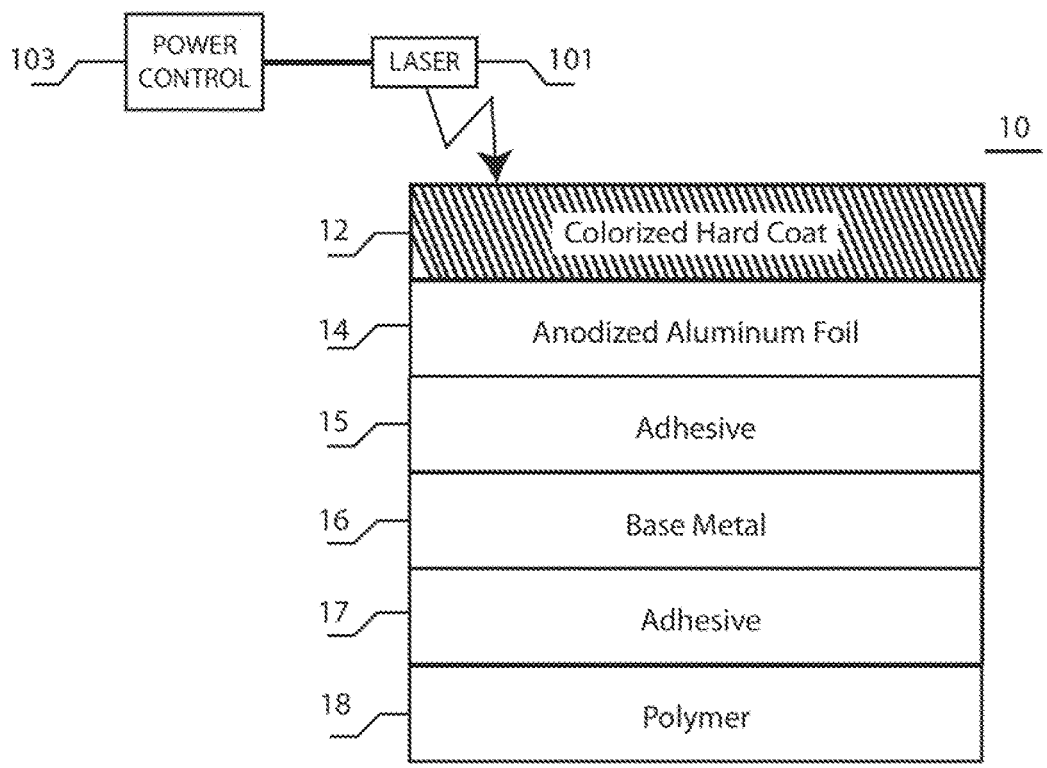
FIG. 2 is a cross sectional diagram of selected layers used to form a card having metal and polymeric layers embodying the invention.

FIG. 2 is a cross sectional diagram of a card 10 which includes the coloring layers shown in FIG. 1 and, in addition, includes a polymeric layer 18 which is attached to the underside of metal layer 16 by adhesive layer 17. The assembly comprised of layers 12, 14, 15, 16, 17 and 18 can be laminated to produce a "Hybrid" card comprising a combination of metal layers and at least one polymer layer. The polymer layer 18 may be of any suitable material (e.g., PVC, PC, PET, etc. . . . ). The polymer layer 18 may include a magnetic stripe and a signature panel. Alternatively, a magnetic stripe and a signature panel may added subsequently after the cards have been separated from the sheet on which multi cards are being formed.

Wireless, Contact or Dual Interface Cards

Figure 3:
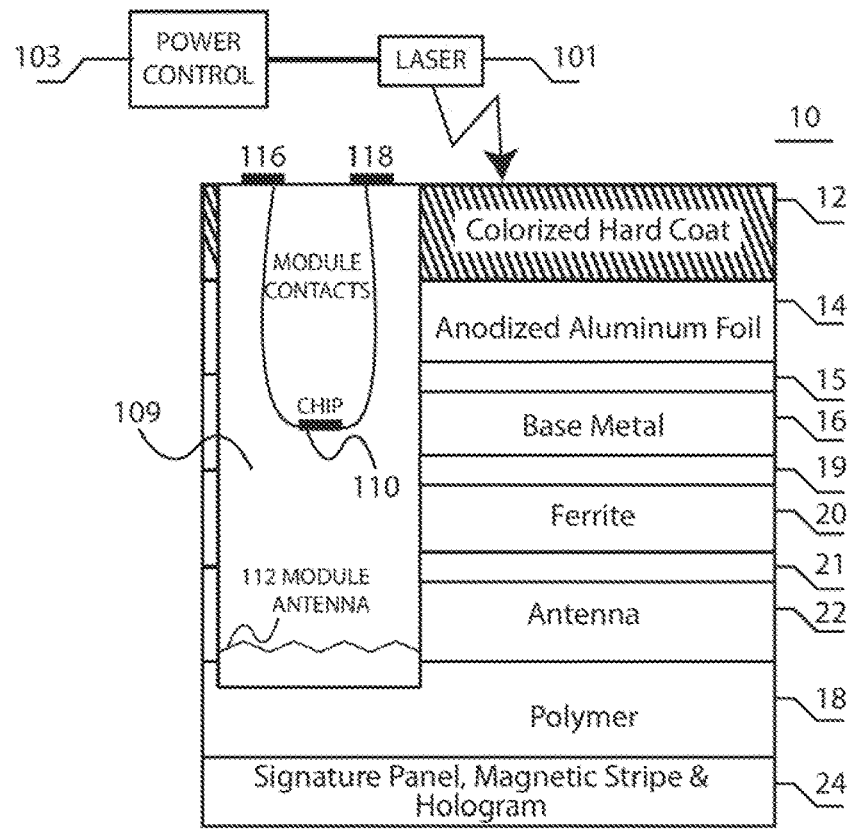
FIG. 3 is a cross sectional diagram of a dual interface smart card having colored layers and a metal layer and polymeric layers embodying the invention.
Figure 4:
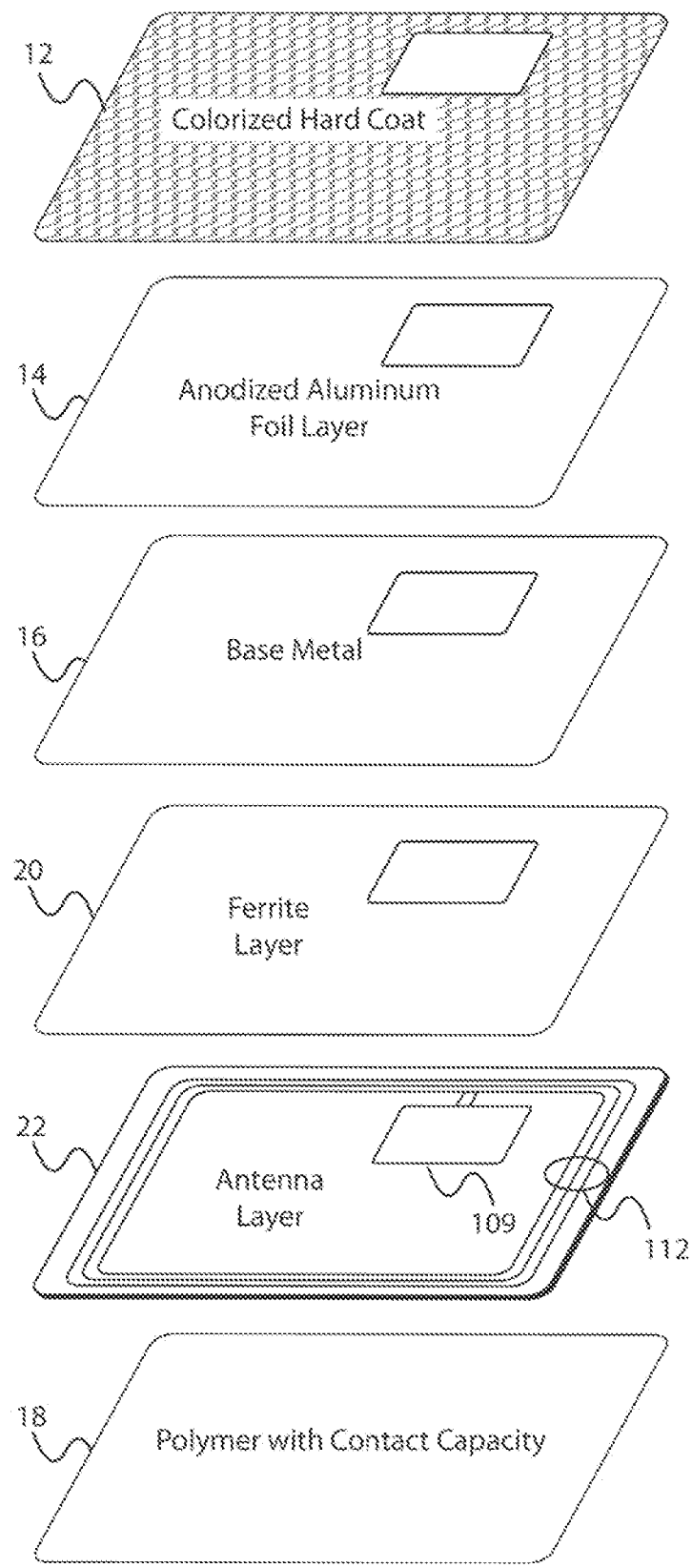
FIG. 4 is an exploded view of the layers and components of a card of the type shown in FIG. 3 (except that the adhesive layers have been omitted)

FIG. 3 is a cross sectional diagram of a Hybrid dual interface metallic smart card having coloring layers embodying the invention and FIG. 4 is an exploded view of the layers and components of a card of the type shown in FIG. 3 (except that the adhesive layers have been omitted). FIGS. 3 and 4 illustrate that cards of selected texture and coloring embodying the invention may be made to include all the components needed to make each card a "smart" card. As shown in FIGS. 3 and 4, the "smart" cards are made to include an integrated circuit module 109 which includes an integrated circuit (IC) 110 (a semiconductor processor chip or micro chip) and a module antenna 112 for RF (wireless/contactless) transmission. The module 109 and its IC 110 are designed to interface with a reader (not shown). The module 109 and its IC 110 may also include contacts (116, 118) extending to the periphery of the card and along the surface of the card to make contact with a reader. The module 109 and its IC 110 may be used as part of a contactless (wireless) system and/or as a direct contact system and/or as a dual interface (contact and/or contactless) system. In FIG. 3, the card 10 includes a ferrite layer 20 attached via adhesive layer 19 to the underside of the metal layer 16. A booster antenna formed on, or in, layer 22 is located between the ferrite layer 20 and the polymer layer 18. The ferrite layer 20 is introduced to prevent the metal layer 16 from attenuating incoming and outgoing RF signals thereby enabling RF transmission between a card reader (not shown) and the chip 110. There is a cut out through the top layers of the card for the module 109 to fit through. The polymer layer 18 may include a magnetic stripe and a signature panel or an additional layer 24 may be attached to layer 18 to provide these functions. With the addition of a colored hard coat layer 12 and the anodized metal layer 14, "smart" dual interface metallic-hybrid cards formed as shown in FIGS. 3 and 4 can be made to have desired color and texture characteristics and also function as any regular smart hybrid or metal card.

Figure 5:
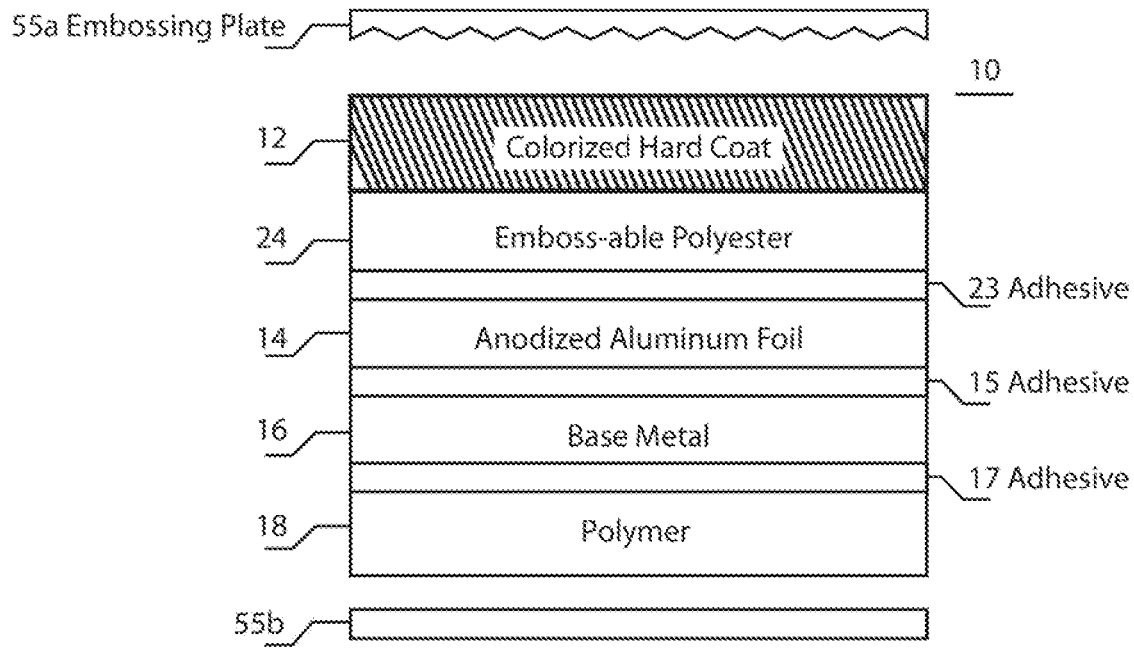
FIG. 5 is a cross sectional diagram of a card which includes an embossable layer of thermally set polymer layer attached to an anodized aluminum foil layer.
Figure 5A:
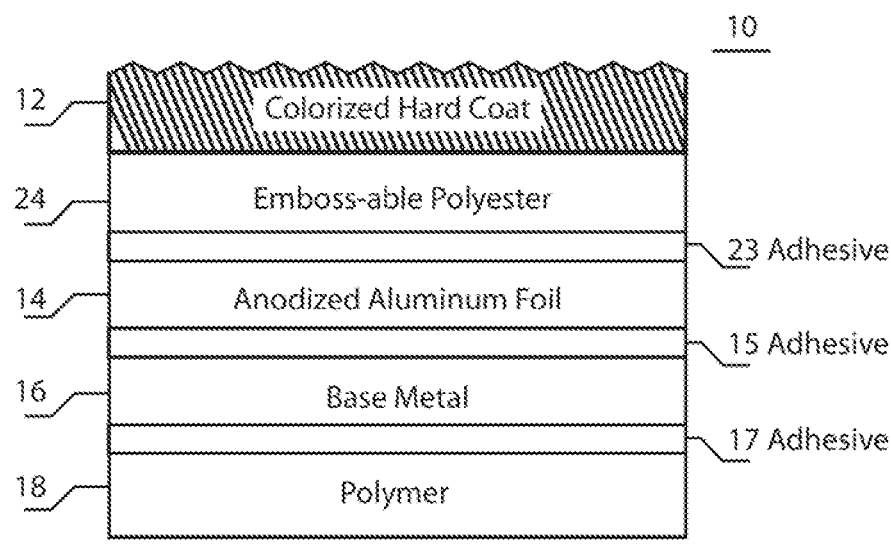
FIG. 5A is a cross sectional diagram showing a surface embossed card of the type shown in FIG. 5.

FIGS. 5 and 5A are cross sectional diagrams of a card like the one shown in FIG. 2 but which, in addition, also includes an embossable copolymer layer 24 (identified in the Figs. as a polyester layer) formed on top of the anodized aluminum film layer 14. A card 10 may be formed as shown in FIG. 5 by assembling the layers 12, 24, 14, 16 and 18 and attaching the layers by means of bonding and/or using adhesive layers 15, 17, 23. The assembly can then be laminated and embossed by means of embossing and laminating plates 55a, 55b to produce an embossed image on the top layer as shown in FIG. 5A or in the other top layers 24 and 14 (layer 12 is optional and may not be used on all cards). FIGS. 5 and 5A thus illustrate how the coloring and texture of cards can be controlled and modified by embossing.

Alternatively, the embossable layer 24 may be a curable polymer and an adhesive layer subsequently attached. The hard coat layer 12 may be placed on the embossable layer before or after the embossing step. During lamination, the embossing plate 55a can be used to emboss a desired image into the co-polyester layer 24 (layer 24 can be any embossable polymer) and also to emboss the anodized metal layer 14 below it. The co-polyester layer 24 (as well as the hard coat layer) provides a scratch resistant layer and the embossing provides a tactile component desirable to the industry. That is, the embossed surface can provide a textured feel to the card. The hard coat layer 12 provides additional protection on top of the polyester and its carrier provides a release from the embossing plate.

FIG. 6 is a top view and FIG. 6A is a cross sectional diagram of a metal transaction card with which can display four (4) different colors and a variety of graphical and textural features. By way of example, the top layer 12 may be a black colored hard coat layer which can provide a background that is more scratch resistant and less expensive than PVD. A second layer 14 of anodized aluminum attached to layer 12 may be colored pink. A third metal layer 16 attached to layer 14 is colored gray. A fourth layer 161, typically of thin plastic (but which may also be a metal layer), attached to layer 16 is colored silver. A laser source 101 can be used to produce a textured and a controlled colored card. A first set of laser settings removes selected portion of the hard coat layer 12 revealing the anodized layer beneath. This is pink in the example and may be used for text or graphics. A second laser setting removes portions of the pink anodized aluminum layer 14 to produce gray features of the metal layer 16. A third laser setting removes portions of the gray metal layer to produce silver colored features of layer 161. Intermediate gradients may be produced by partially removing each layer. This opens up a variety of artistic and textural possibilities on metal transaction cards not previously possible.

FIG. 6B illustrates that the anodized layer 14 can be formed to contain many different colored sub-layers (141, 142, 143, 144). That is, layer 14 is a multi-colored layer. During the anodizing process, different colors may be introduced to different sub-segments (sub-layers) of the aluminum layer. The different colors may be displayed by lasering down through the different sub-layers of layer 14 to display the different colored levels. Instead of lasering, the different colors may be displayed by mechanical engraving or other means of material removal. The additional layers may also be colorized hard, coat layers solely or in combination with metal layers.

As discussed above, cards embodying the invention may be formed as shown in FIGS. 1, 2, 3, 5 and 6 by first assembling selected polymeric and metals layers and bonding or adhesively attaching them. The various layers are generally laminated at temperatures ranging from 200 F to 500 F under effective pressures of 50 to 500 PSIA. Typically, a first set of optimized laser or mechanical engraving parameters are used to remove the colored, transfer hard coat (e.g., 12) showing the colored, anodized layer beneath. Then, a second set of optimized laser or mechanical engraving parameters are used to remove portions of the colored anodizing layer (14), revealing the metal beneath. In the case of FIGS. 6 and 6A a third set of optimized laser or mechanical engraving parameters may be used to reveal another colored layer (161). The various layers may be further mechanically engraved through the anodized metal to the main body of the card, typically stainless steel. As a final step in making the cards, cards are cut to size and final processing such as hot stamp is completed.

Figure 11:
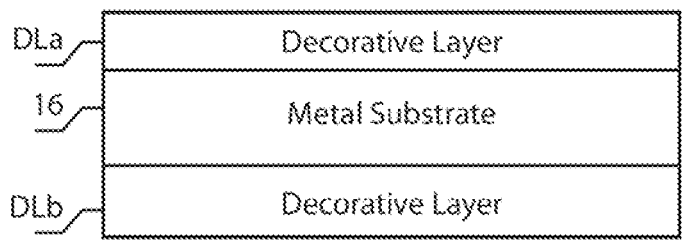
FIG. 11 is a highly simplified cross sectional diagram showing decorative layers attached to the top and bottom surfaces of a metal substrate.

The anodized aluminum layer is thus used as a thin decorative layer (see DLa, DLb in FIG. 11). In accordance with one aspect of the invention, a thin decorative layer includes at least one anodized metal layer to add color and/or texture to a card. The cards may also include additional layers of different colors which may be assembled and laminated with the anodized metal layer to form multi layered cards. The cards may be processed (e.g., by lasering) to produce cards having different colors and texture. A controlled varying laser power device (or any like functional device) may be applied to multi layered cards to remove selected portions of the different layers to alter the color and pattern being displayed and the texture of the card.

In the manufacture of cards embodying the invention it has become important for commercial and aesthetic reasons to produce metal cards with certain texture and color and to maintain the texture and color. As already discussed and shown above, metal cards embodying the invention may be formed to include a core metal layer 16 with a decorative layer (e.g., 14, or DLa in FIG. 11) above the metal layer 16. Alternatively, a decorative layer (e.g., DLa, DLb in FIG. 11) may be formed above and below the core metal layer 16, or only below the core metal layer.

Cards with Wood Veneer

FIG. 7 illustrates the manufacture of a "textured" metal card having a thin decorative layer which is selected to be an actual wood layer positioned on the top surface of the card. Note that the use of "wood" is by way of example only and is meant to include any material derived from a (living) plant having similar characteristics to wood. The use of a wood layer (or any like material) is aesthetically significant since it has unique properties. That is, the grain and appearance of an actual wood strip is virtually impossible to duplicate and represents a high level of individuality. However, significant problems exist in maintaining the texture and appearance of the actual wood layer used in forming cards. These are overcome in the manufacture of cards in accordance with the invention.

Figure 7A:
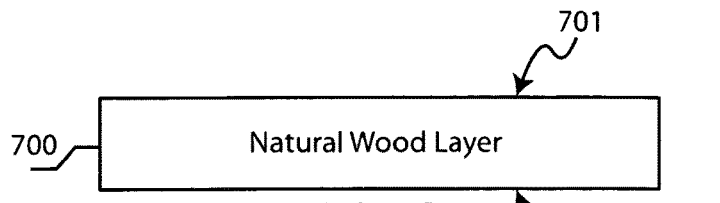
FIGS. 7A through 7E are cross sectional diagrams illustrating some of the process steps to form a metal card with a natural wood veneer in accordance with the invention.

Referring to FIG. 7, the following procedure or steps may be used:

1— As shown in FIG. 7A, a natural wood veneer layer 700 with low lignin content is selected. The use of a wood layer with low lignin content makes it easier to maintain the appearance of the wood layer through the various lamination and processing steps to form a card.

Figure 7B:
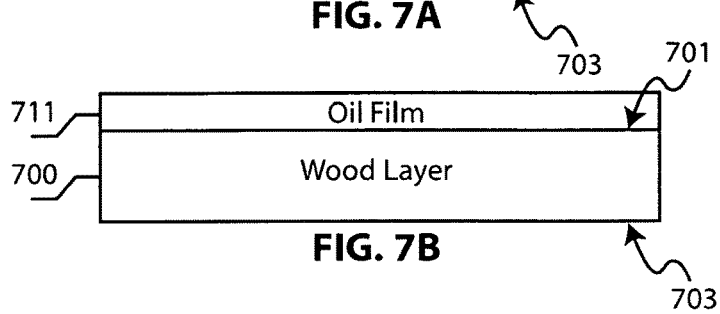

2— Pretreat the wood layer 700 having a top surface 701 and a bottom surface 703, as shown in FIG. 7B:

a— Sand down back surface 703 of wood layer 700 until wood layer has desired thickness. The range of the wood veneer and all the other veneers may range from 0.001 inches to 0.014 inches.

b— Apply an oil film 711, such as linseed oil, to top surface 701 of wood layer 700; the oil layer 711 ensures that the moisture contained in the wood layer and its general appearance is maintained when the wood undergoes lamination. It was found that applying a thin oil film (e.g., of linseed oil) was very significant in maintaining the wood layer in good condition through the lamination process. The oil replaces the water in the wood structure with higher boiling point materials.

Figure 7C:
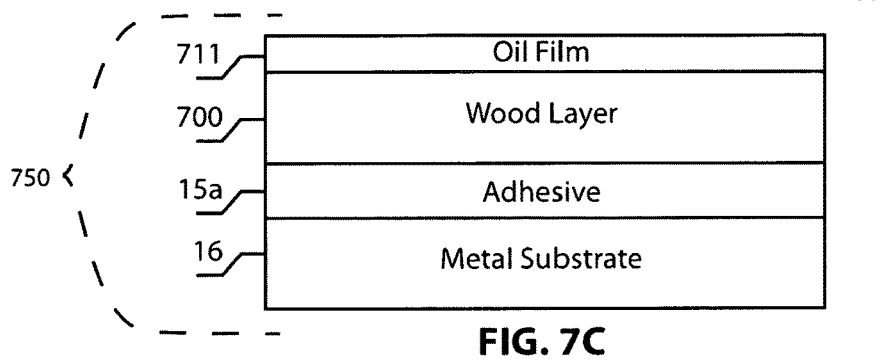

3— Form an assembly 750, as shown in FIG. 7C, which includes the treated wood layer 700 attached to a metal substrate 16 with an adhesive 15a. The adhesive layer 15a may include an acid modified polyolefin or may be any suitable adhesive. Typically, layer 700 will have a thickness ranging between 0.001 inches 0.014 inches and metal layer 16 will have a thickness ranging between of 0.005 inches and 0.032 inches.

Figure 7D:
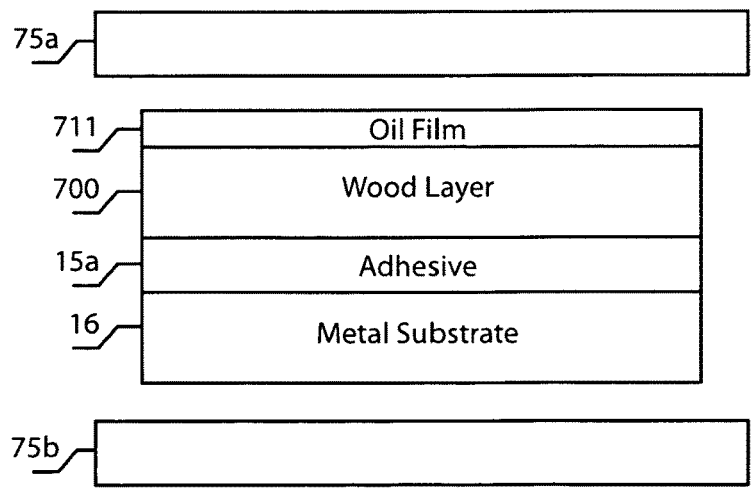

4— Laminate the assembly 750 as shown in FIG. 7D using platens 75a and 75b.

5— Note that platens 75a and/or 75b could also include embossing plates (not shown) to enable the assembly 750 to be embossed and laminated at the same time.

Figure 7E:
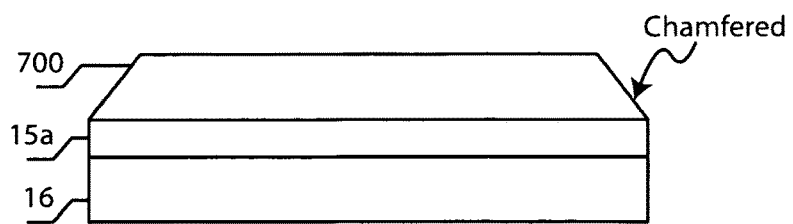

6— Chamfer the wood layer 700 as shown in FIG. 7E so as to cut away (a right-angled edge or corner) to make a symmetrical sloping edge and minimizes problems of the edges of the card fraying or peeling back.

Cards with Cement Veneer

FIG. 8 illustrates the manufacture of a "textured" metal card having a thin decorative layer which is selected to be a veneer layer 800 of an aggregate binder material. The aggregate binder material may be, for example, cement, mortar, epoxies and glues, mixed with laser reactive materials such as finely divided carbon or commercially available laser additives. In FIG. 8A, the layer 800 is shown to be a cement layer mixed with carbon material. But, as noted above, the cement may be another of the materials mentioned. The use of a cement layer provides a unique tactile feel. However, significant problems exist in producing cards having certain texture and color and in maintaining the texture and providing images with high level of contrast. These are overcome in the manufacture of these cards in accordance with the invention.

Referring to FIG. 8, the following procedure or steps may be used to treat an aggregate binder material (e.g., cement) and enhancing color contrast of the treated cards.

Figure 8A:
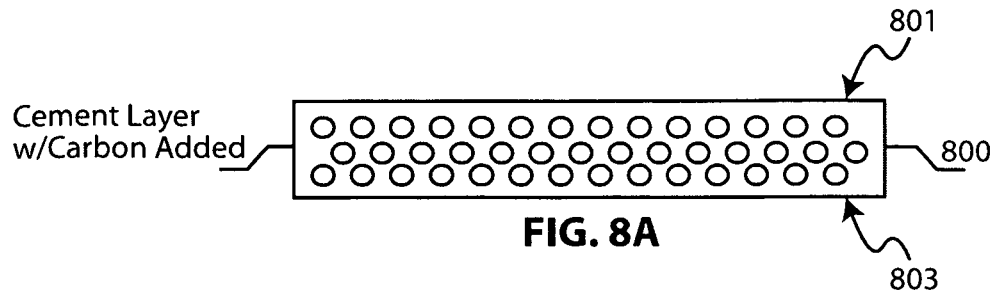
FIGS. 8A through 8D are cross sectional diagrams illustrating some of the process steps to form a metal card with a cement veneer in accordance with the invention.

1— A shown in FIG. 8A, form a cement, layer 800 from a cement mix in which carbon material (e.g., carbon soot) has been added to produce a grayish colored cement layer 800.

2— Grind down top and or bottom surfaces (801, 803) of layer 800 to produce a layer with desired thickness which typically ranges between 0.001 inches and 0.010 inches.

Figure 8B:
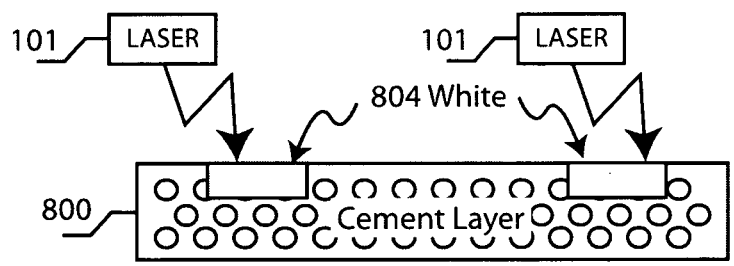

3— Use laser apparatus 101 to laser the cement layer as shown in FIG. 8B to produce a desired pattern (regions 804). The laser 101 vaporizes the carbon particles in selected regions producing a white pattern which contrasts to the gray background.

Figure 8C:
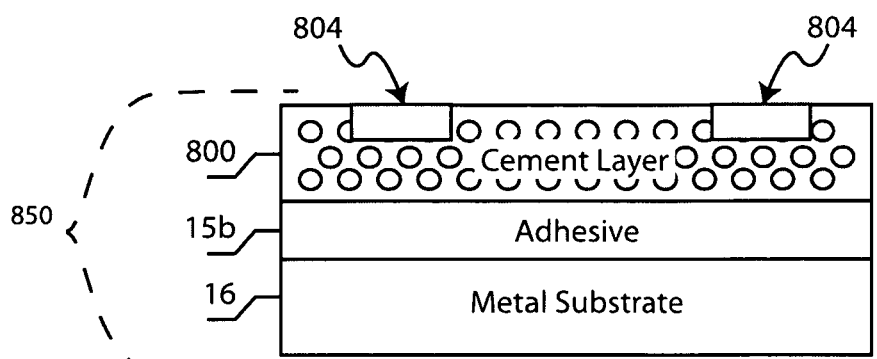

4— The lasered cement layer 800 may then be attached to a metal substrate 16 via a suitable adhesive layer 15b to form assembly 850 as shown in FIG. 8C.

5— Alternatively to step 3 above, the unlasered cement layer 800 may first be attached to the metal substrate 16 and then lasered.

Figure 8D:
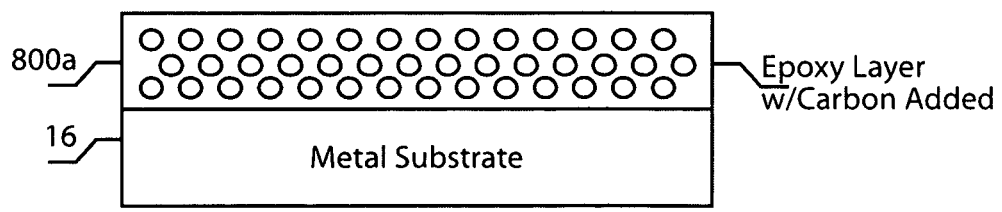

6— FIG. 8D illustrates that a layer 800a can be formed using an epoxy material mixed with, carbon particles. The layer 800a can be directly attached to a metal substrate 16. The layer 800a can be subjected to a lasering procedure before it is attached to metal base 16 or after it is so attached. The use of an epoxy material eliminates the need for an additional adhesive layer and provides a very strong bond between the epoxy layer 800a and the underlying metal substrate 16, which may for example be steel or any other suitable metal.

Cards with Leather Veneer

FIG. 9 illustrates the manufacture of a "textured" metal card having a thin decorative layer which is selected to be an actual leather veneer layer positioned on the top surface of the card. Note that any like animal derive material may be used instead. As in the case of the "natural" or "actual" wood layer, the use of an actual leather layer is significant since it has many unique properties. That is, the grain and richness of appearance and the pattern displayed by an actual leather layer is virtually impossible to duplicate and represents a high level of personalization. However, significant problems exist in maintaining the texture and appearance of the "natural" leather layer used in forming cards. These are overcome in the manufacture of cards in accordance with the invention.

Figure 9A:
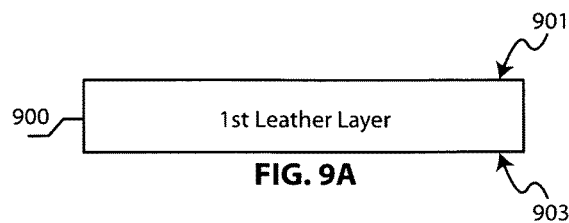
FIGS. 9A through 9E are cross sectional diagrams illustrating some of the process steps to form a metal card with a natural leather veneer in accordance with the invention.
Figure 9B:
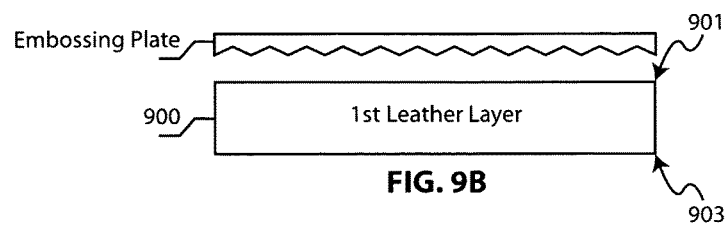
Figure 9C:
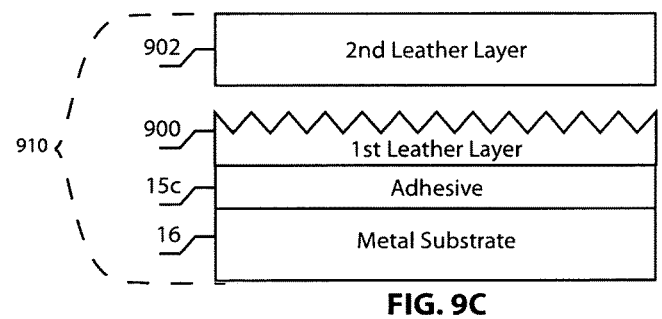
Figure 9D:
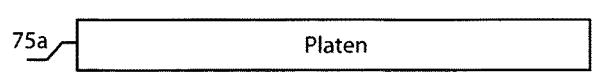
Figure 9E:
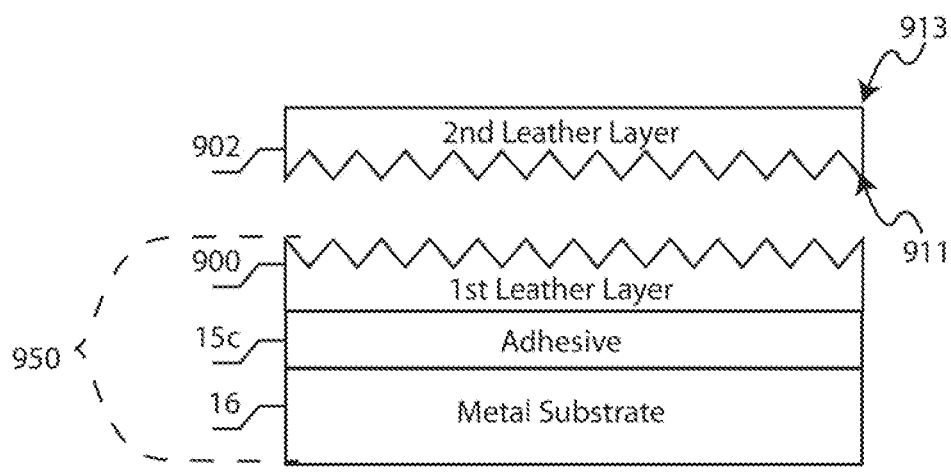

Referring to FIG. 9, the following procedure or steps may be used to form a card:

1. As shown in FIG. 9A, there is a selecting step. That is, select a natural leather layer 900 having a natural unique pattern on its top surface 901.
2. Then there is a leather processing or treatment for preparing the backside 903 of the leather layer 900 so the leather layer has the desirable thickness and the bottom surface is adapted to accept an adhesive. A typical thickness will be in the range of 0.003 to 0.014 inches. Though this can be made thinner and thicker.
3. Then there is an embossing step as shown in FIG. 9B. A desired pattern is embossed on the top surface 901 of first ($1^{st}$) leather layer 900.
4. A highly novel feature employed to laminate the leather layer 900 to an underlying metal substrate 16 also enables the production of a mirror image of the embossed pattern. Of great significance is that the lamination procedure for securing the embossed leather layer 900 to the underlying metal substrate 16 preserves all the fine features of the leather 900 layers as well as the embossed pattern. This is accomplished as follows. An assembly 910 is formed as shown in FIG. 9C which includes:
    a— The embossed $1^{st}$ leather layer 900 attached via an adhesive layer 15*c* to a metal substrate layer 16; and
    b— A blank (un-embossed) leather layer 902 (i.e., $2^{nd}$ leather layer) having its top surface facing the embossed surface 901 of $1^{st}$ leather layer 900 is shown placed between the embossed leather layer 900 and a platen 75*a*. Layer 902 may be like layer 900 or may be any similar leather like material. Layer 902 is selected to have the same or similar texture to layer 900.
5. As shown in FIG. 9D, the assembly 910 undergoes a lamination step. Due to the proper selection of layers 900 and 902 (and appropriate lamination pressures), the lamination process maintains the features and pattern embossed in $1^{st}$ leather layer 900 intact to produce an assembly or sub assembly 950, as shown in FIG. 9E.
6. At the same time the embossed pattern is transferred (as a mirror image) to the top surface 911 of $2^{nd}$ leather layer 902 which can then be used to emboss a subsequent leather layer, or like layer as shown in FIG. 9E. This is significant in that the "uunembossed" leather layers (e.g., 902) becomes the template for the manufacture of a next series of cards; thereby producing a continuous generation.

Cards with Pocket for Decorative Layers/Patches

Figure 10A:
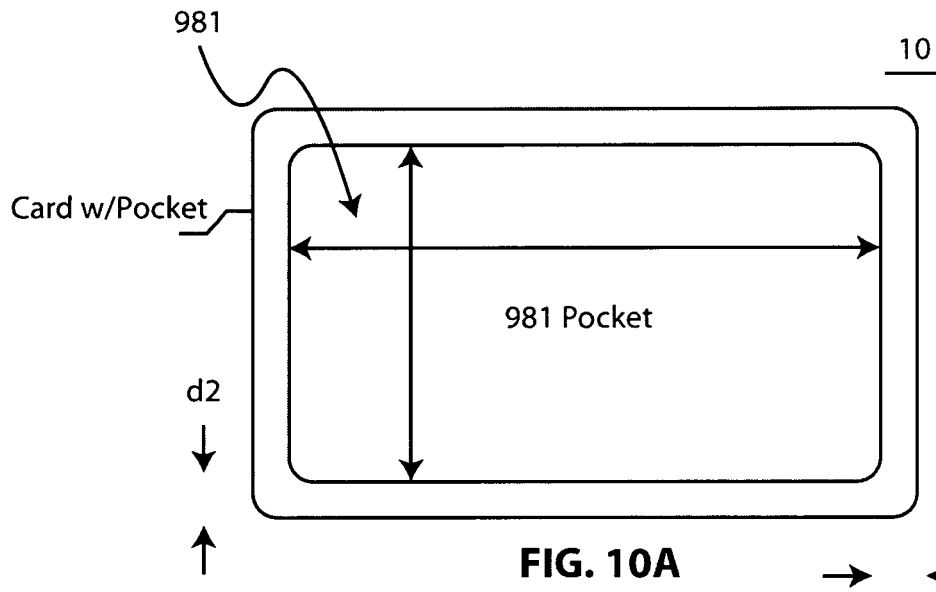
FIG. 10A is a top view of a pocket formed in the top surface of a metal substrate.
Figure 10B:
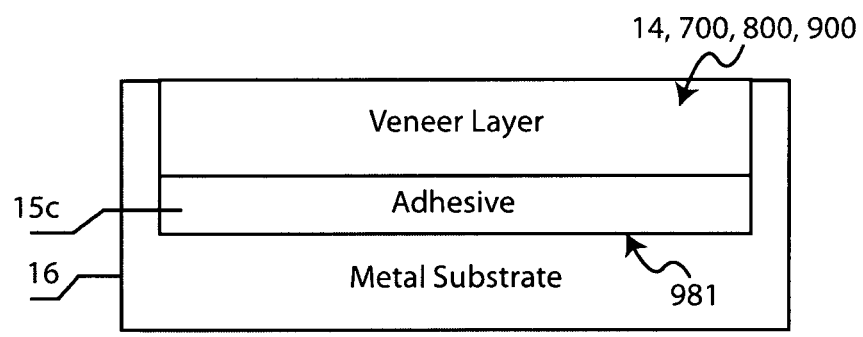
FIG. 10B is a cross sectional diagram showing a decorative layer attached to the pocket of FIG. 10A.

The edges of the veneer layers may be subjected to fraying and to peeling. One approach to avoid this problem is to chamfer the edges of the veneer layers as shown in FIG. 7E. Another approach is to form a pocket 981 in the top surface of metal cards as shown in FIG. 10. FIG. 10A is a top view of a card with a cut out 981 to form a pocket in the top surface of the card. The pocket may be formed using any known technique. The edges d1 and d2 may be in the range of 0.01 to 1.125 inches and may be uneven or form an artistic pattern. FIG. 10B is a cross sectional view showing that an anodized aluminum layer 14 or any veneer layer (e.g., 700, 800, 900) may be attached via a suitable adhesive 15*c* to the top inside surface of the card's pocket 981 cut out from core metal layer 16. This arrangement is elegant and protects the edges of the anodized or veneer layers from being frayed, worn, or peeling.

Figure 10C:
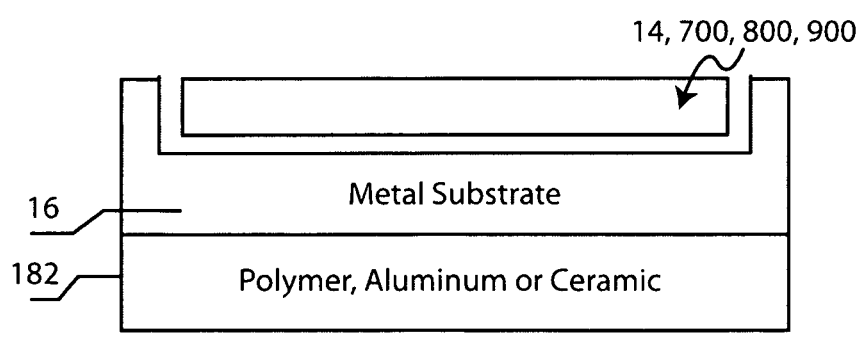
FIG. 10C is cross sectional diagram showing additional layers attached to the bottom surface of the metal substrate.

FIG. 10C illustrates that a polymer, aluminum or ceramic layer may be attached to the underside of the metal substrate.

Figure 10D:
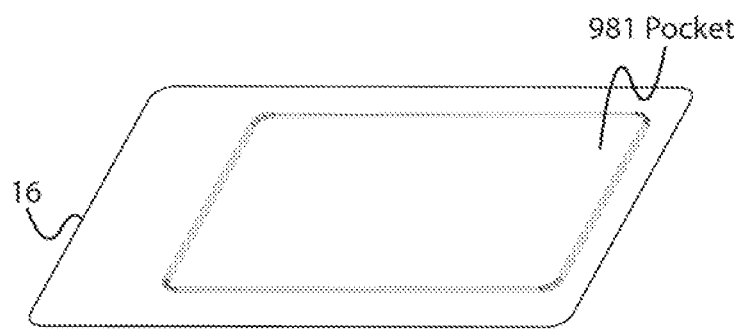
FIG. 10D is a top isometric view of a metal substrate in which a pocket is formed to position therein a decorative layer which may be, for example, an anodized metal layer or any veneer layers shown, for example, in FIG. 7A, 8A or 9A.

FIG. 10D is an isometric top view of metal layer 16 in which the pocket 981 has been formed. For purpose of illustration the pocket is shown not to be symmetrically located. The pocket 981 may be made a small or large portion of the card surface with regular or irregular borders.

Figure 10E:
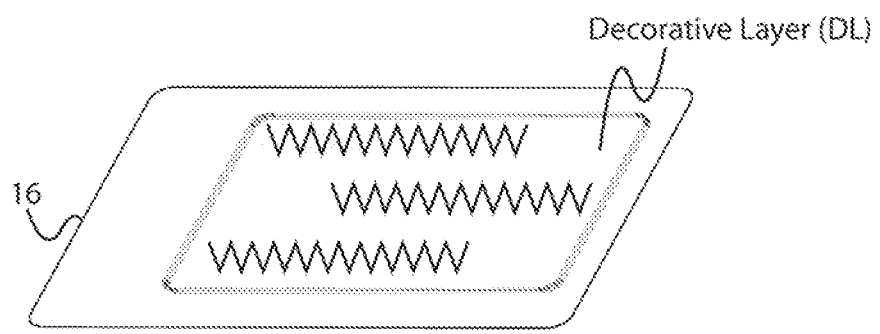
FIG. 10E is a top isometric view of the card of FIG. 10D with a decorative layer inserted in the pocket and attached to the metal substrate.

FIG. 10E illustrates that any decorative layer (DL) may be attached to, or formed within, the pocket 981. This includes anodized aluminum layers, various veneer layers discussed above as well as any other decorative veneer layers or substance. This includes, by way of example, a presently commercially available product termed Swarovski Elements Crystal Fabric. This material includes a carrier material that is completely covered by millions of tiny cut and round crystals. It is elastic, tear resistant and extremely light. The carrier material features low temperature glue so that is may be applied to a variety of surfaces by low temperature heating. This glue may be replaced with a more aggressive adhesive for harsher environments.

In other embodiments of the invention, small pockets of very limited area (e.g., a small portion of the surface area of the card) having virtually any shape can be formed in the card for the inclusion therein of any decorative material.

The above is by way of illustration. In general, in accordance with the invention various methods and apparatus have been shown for treating a thin anodized metal layer and/or a selected thin veneer layers for attachment to a thick metal substrate for producing cards having desired color and texture characteristics.

Metal cards embodying the invention may be formed as shown in FIG. 11 to include a core metal layer 16 with a decorative layer (DLa) above the metal layer and a decorative layer (DLb) below the metal layer. Each one of the decorative layers DLa and DLb may be: (a) an anodized metal layer, (b) a plant derived material veneer layer, such as wood; (c) an animal derived material veneer layer, such as leather; (d) an aggregate binder material veneer layer, such as cement or epoxy mixed with laser reactive materials; (e) a ceramic layer; or (f) a layer of crystal fabric material. That is, one decorative layer (e.g., DLa) may be any one of the layers identified in a-f, above, and the other decorative layer (e.g., DLb) may be like DLa or a different one of the layers identified in a-f.

Figure 11A:
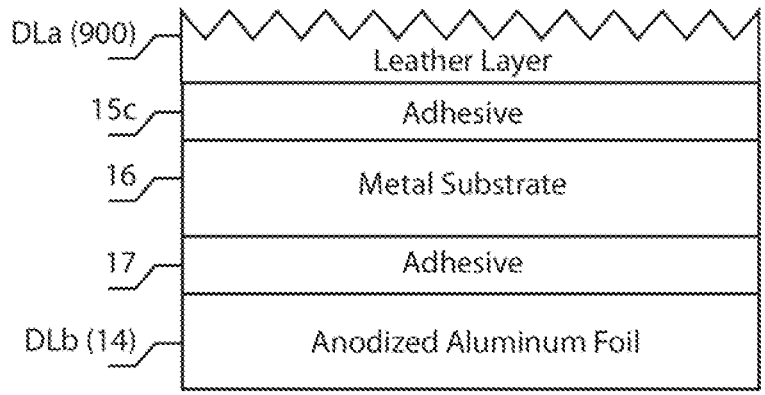
FIG. 11A through 11C are cross sectional diagrams showing that the decorative layers attached to the top and bottom surfaces of a metal substrate may be different.

In FIG. 11A a leather layer 900 is attached via an adhesive 15*c* to one side (top surface in the figure) of the metal substrate 16 and an anodized aluminum layer 14 is attached to the other side (bottom surface in the figure) of the metal substrate. In this figure (and in FIGS. 11B and 11C below) one type of thin decorative layer (e.g., leather) is attached to the top of a metal substrate and a different thin decorative layer (e.g., anodized aluminum) is attached to the bottom surface of the metal substrate.

Figure 11B:
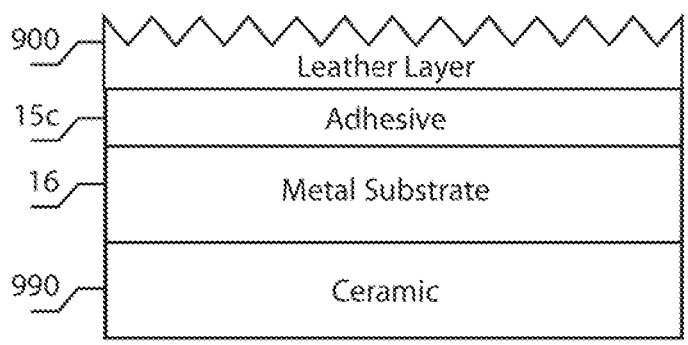

In FIG. 11B a leather layer 900 is attached via an adhesive 15*c* to one side (top surface) of the metal substrate 16 and a ceramic veneer layer 990 is attached to the other side (bottom surface) of the metal substrate.

Figure 11C:
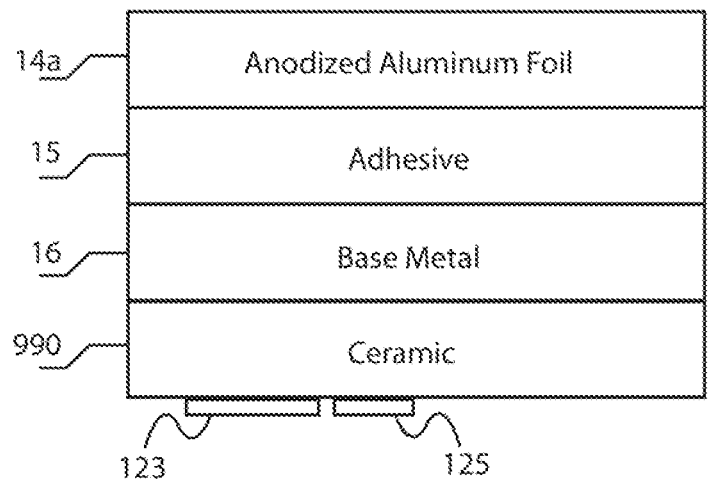

In FIG. 11C an anodized aluminum foil 14*a* is attached via an adhesive 15 to one side (top surface) of the metal substrate 16 and a ceramic veneer layer 990 is attached to the other side (bottom surface) of the metal substrate. A signature panel 123 and a magnetic stripe 125 are shown attached to the ceramic layer 990.

FIGS. 11B and 11C illustrate that a decorative veneer layer may be a layer of ceramic material 990. Ceramic materials have very desirable characteristics because they may be made to have virtually any color and can be attached (bonded) to the metal substrate without using an adhesive. The layer of ceramic material may be applied directly (e.g., sprayed on) to the metal substrate 16 and then baked on or cured to the metal 16. In addition, FIGS. 11B and 11C illustrate that one of the decorative layers may be a veneer layer of one type (leather, anodized aluminum) and the other decorative layer may be of a different type (e.g., ceramic).

Figure 11D:
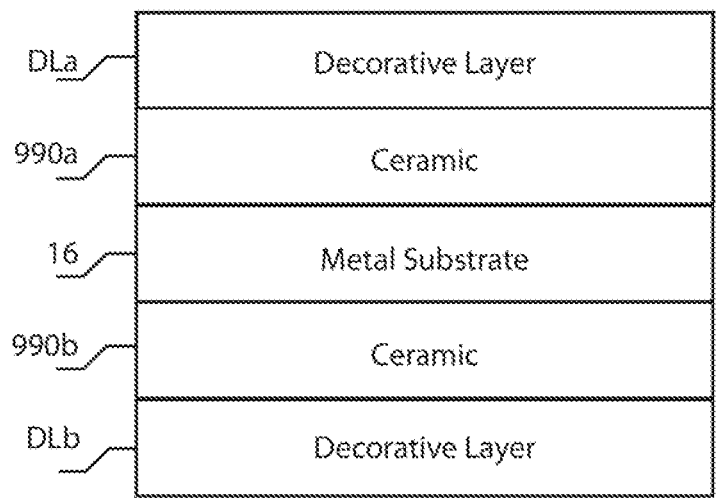
FIG. 11D is a cross sectional diagram showing ceramic and decorative layers attached to the top and bottom surfaces of a metal substrate.

FIG. 11D illustrates that a metal substrate 16 may have a decorative layer DLa and a ceramic layer 990*a* attached to the top surface and a decorative layer DLb and a ceramic layer 990*b* attached to its bottom surface. Due to the wide range of different color and textures available to the decorative layers and the ceramic layers, cards may be made with a very wide range of coloring and textures.

Figure 11E:
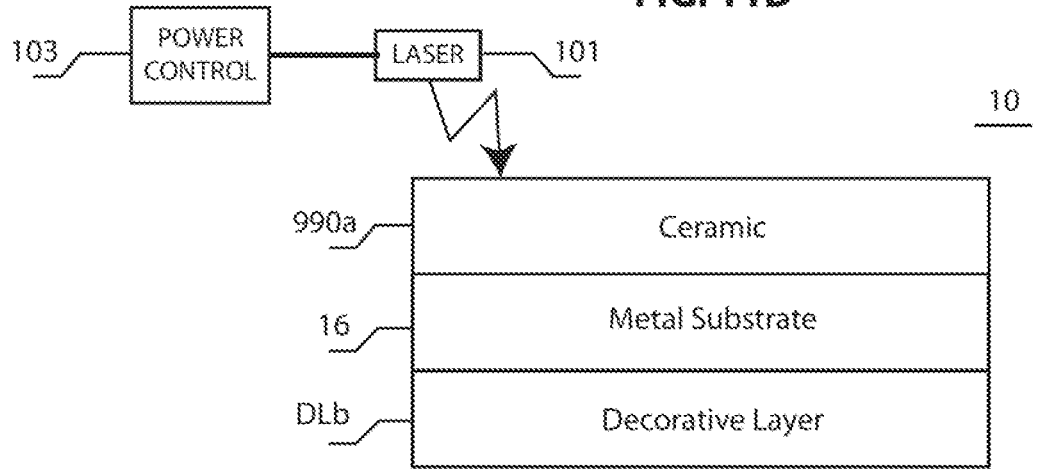
FIG. 11E is a cross-sectional diagram of a metal card with a ceramic decorative layer to which a laser source is applied for modifying the appearance and texture of the card.

FIG. 11E shows a laser source 101 which can be used to laser engrave a decorative ceramic layer 990*a* attached to the top surface of a metal substrate 16 having a like or different decorative layer DLb attached to the bottom surface of layer 16. the ceramic layer 990*a* also may be modified with mechanical or chemical engraving, inkjet printing, laser marking and other methods known to the art to provide a desired artistic effect.

Figure 11F:
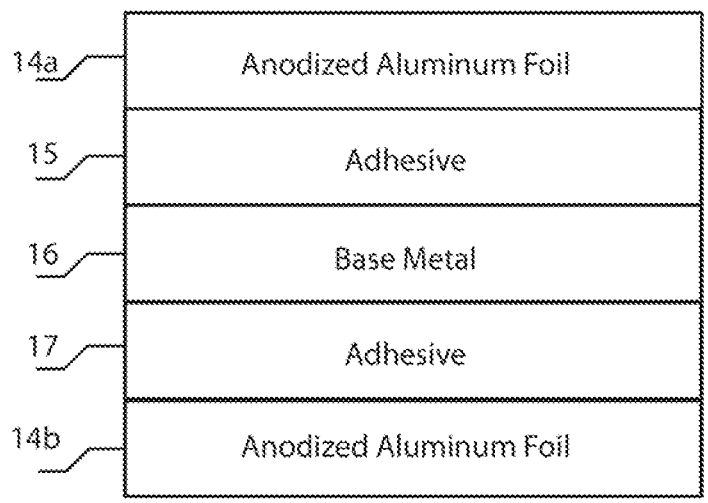
FIG. 11F is a cross sectional diagram showing one type of thin decorative layer (anodized aluminum) attached to the top and bottom surfaces of a metal substrate in accordance with the invention.

FIG. 11F shows a metal substrate 16 with an anodized aluminum foil 14*a* attached to its top surface and an anodized aluminum foil 14*b* attached to its bottom surface. Foils 14*a* and 14*b* may have different colors, thicknesses and shapes.

Figure 12:
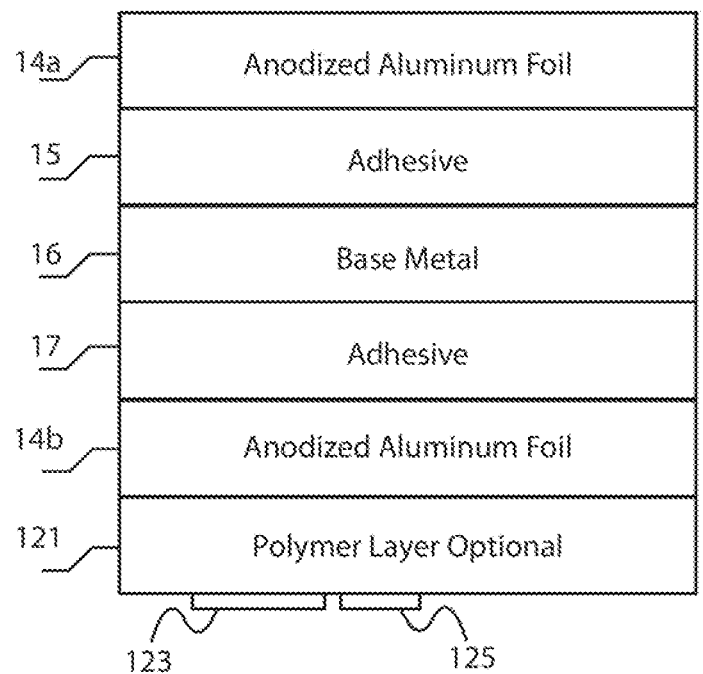
FIG. 12 is a cross section diagram of a card with an optional polymer layer attached to the bottom side of a decorative layer.
Figure 12A:
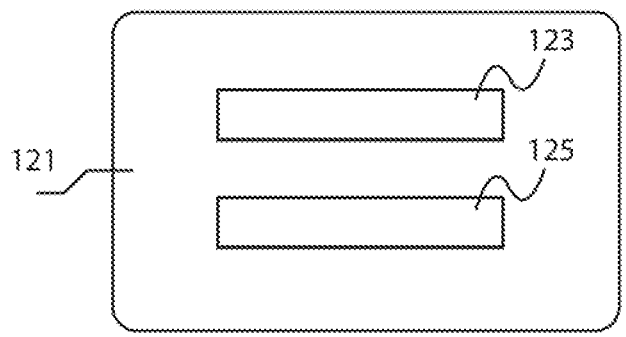
FIGS. 12A and 12B are bottom views of a signature panel and a magnetic stripe attached to the underside of a polymer layer or an anodized aluminum foil.

FIG. 12 is a cross sectional diagram of a metal card showing a structure similar to that of FIG. 11F. The card has an anodized aluminum layer 14*a* attached via an adhesive 15 to one side (top surface in the figure) of a metal substrate 16 and another anodized aluminum layer 14*b* attached via an adhesive 17 to the other side (bottom surface in the figure) of the metal substrate. Anodized layers 14*a* and 14*b* are decorative layers attached to the metal layer 16. A polymer layer 121 is shown attached to the bottom side of layer 14*b*. As shown in FIG. 12A, layer 121 may be a clear polymer layer so that the coloring and decorative features of layer 14*b* can be displayed and seen. A signature panel 123 and a magnetic stripe 125 are formed on the surface of layer 121.

Figure 12B:
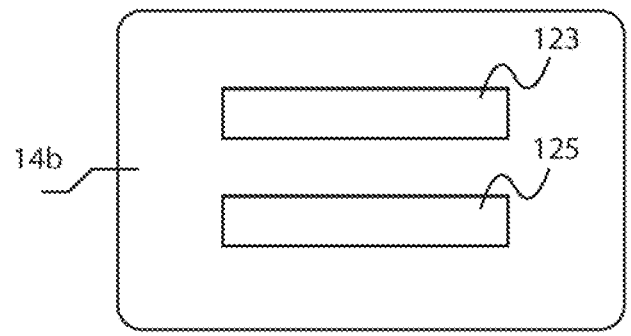

The use of Layer 121 is optional. As shown in FIG. 12B, the bottom layer of the card may be layer 14*b* (i.e., no polymer layer is used). In a particular embodiment, Applicants used a thermoset type adhesive to attach a signature panel 123 and a mag stripe 125 directly to the anodized aluminum layer 14*b*.

Figure 13A:
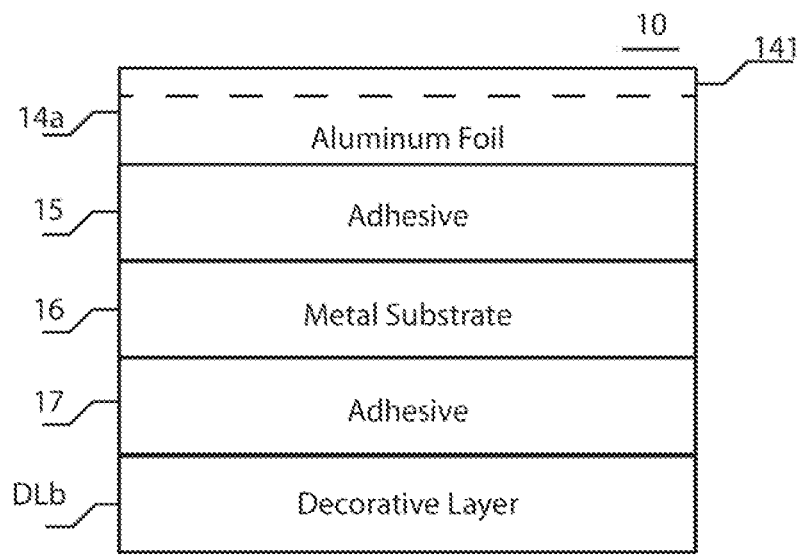
FIG. 13A is a cross sectional diagram of a card with a colored anodized aluminum foil attached to a metal substrate in accordance with the invention.

FIG. 13A illustrates the coloring and decorative features of cards embodying the invention. In FIG. 13A, the top anodized layer 14*a* has a top region 141 which, by way of example, is colored blue. The thickness of region 141 may range from less than 0.1 microns to more than 5 microns. (However it should be understood that it is subject to a wide variation). Layer 14*a* is attached via adhesive layer 15 to the core metal substrate 16 which in turn is attached via an adhesive 17 to a decorative layer DLb which may be any layer of the type identified as (a) through (f), above.

Figure 13B:
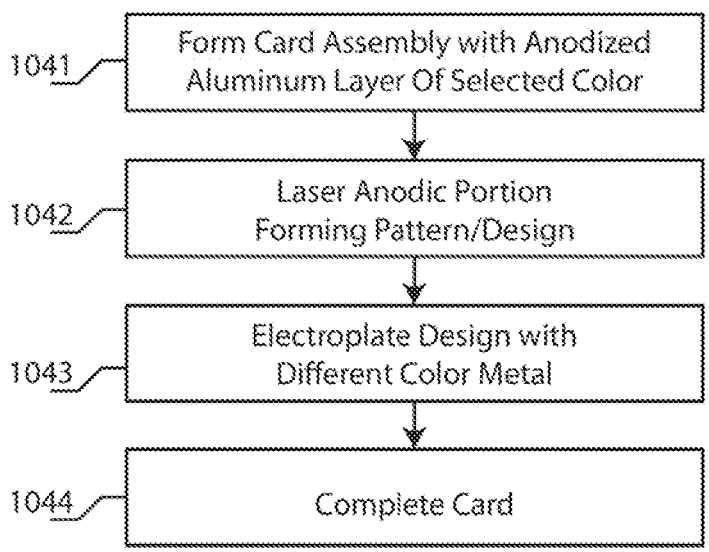
FIG. 13B is a diagram illustrating some of the process steps to form the card in accordance with the invention.
Figure 13C:
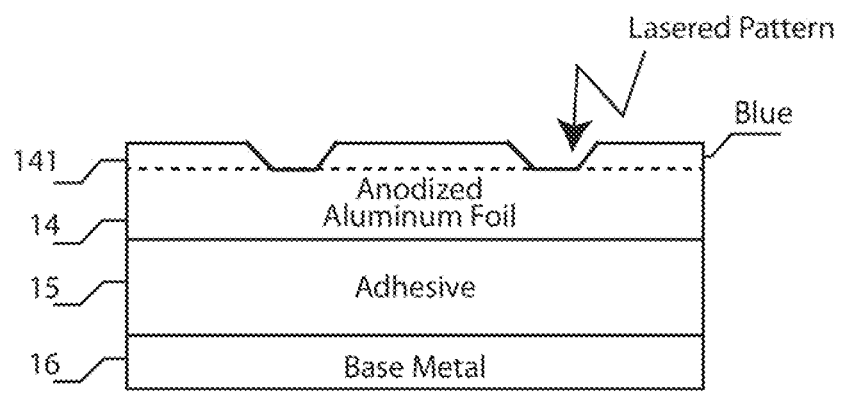
FIG. 13C is a cross sectional diagram illustrating the formation of a pattern in the anodized aluminum layer of FIG. 13A.
Figure 13D:
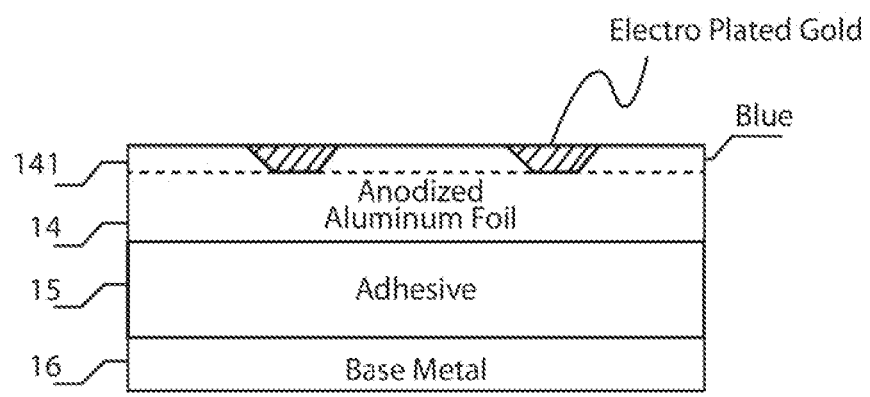
FIG. 13D is a cross sectional diagram illustrating the result of electroplating the pattern formed in the anodized aluminum layer of FIG. 13A with a noble metal.

As shown in FIG. 13B, after the layers shown in FIG. 13A are assembled (see box 1041), a pattern may be formed by removing selected portions of the anodic material in region 141 (see box 1042), leaving the underlying uncolored aluminum foil. That is, the portion of layer 14 or 14*a* below region 141. The removal of material in region 141 may be done by means of a laser or by any other suitable means. For example, if a laser is used, the laser just removes material in layer 141 until it gets past region 141, baring the rest of layer 141. This is illustrated in FIG. 13C, which shows the pattern limited to removal of selected portions of the blue colored material in region 141. The lasered assembly can then be subjected to an electroplating process (see box 1043), with a metal such as gold or any suitable metal, for electroplating the selected metal on or within the pattern formed in the anodic region 141. The pattern formed may have the appearance shown in FIG. 13D. The card may be further processed (completed), as shown in box 1044, to include any and all additional features to form all types of cards as discussed above.

Ceramic Cards

Figure 14:
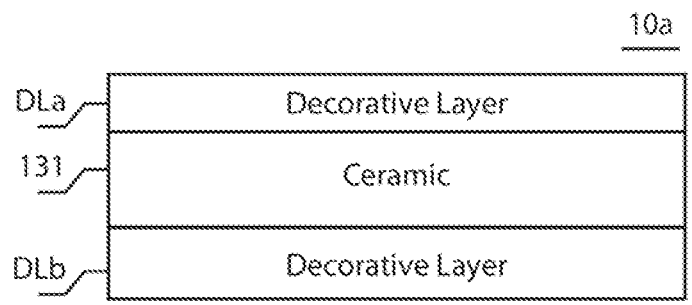
FIG. 14 is a cross sectional diagram of a card with a ceramic core and decorative layers.
Figure 14A:
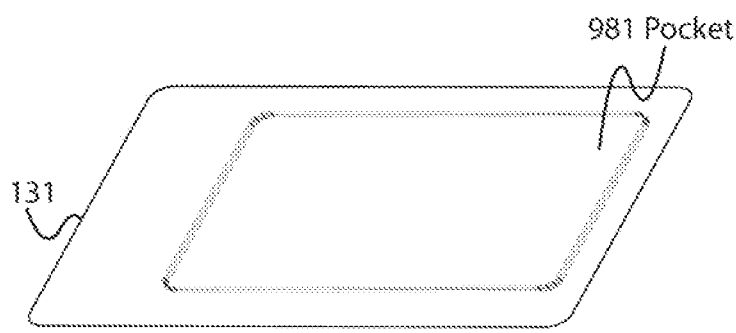
FIG. 14A is an isometric top view of a pocket formed in a ceramic core layer.
Figure 14B:
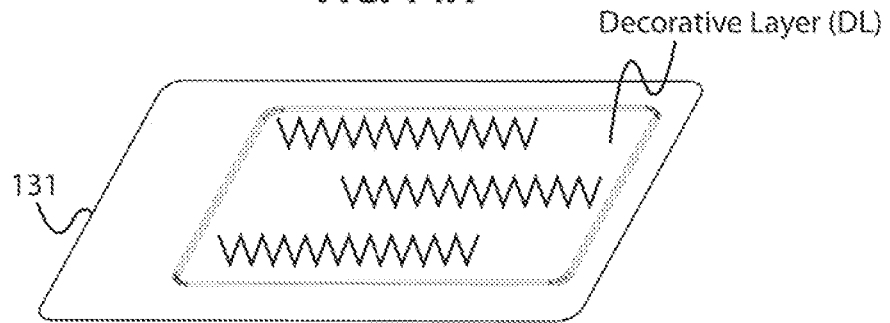
FIG. 14B is an isometric top view of a decorative layer attached to the pocket of FIG. 14A.

FIG. 14 illustrates that a card 10*a* can be formed with a ceramic core 131 which can be designed to provide a predetermined color. A decorative layer DLa can be attached to the top side of the ceramic core and/or another decorative layer DLb can be attached to the bottom side of the core layer. The decorative layer DLa may be the same as the decorative layer DLb; but they need not be the same. FIG. 14A illustrates that a pocket 981 can be formed within the ceramic layer for the placement therein of a decorative layer (DL) as shown in FIG. 14B. The decorative layer may be any layer of the type discussed above or any other suitable material. The ceramic materials are inorganic, non-metallic materials made from compounds of a metal and a non-metal. Ceramic materials may be crystalline or partly crystalline. They are formed by the action of heat and subsequent cooling. Ceramic materials tend to be strong, stiff, brittle, chemically inert, and non-conductors of heat and electricity.

It is desirable to use ceramic cards for similar reasons that it is desirable to use metal cards. In the modern transactional card market, it is often desirable to obtain a 'premium' feel, look, or tactile feature that may be marketed to an affluent market. These transactional cards may be used as debit cards, credit cards, or pre-paid cards. As part of this premium feel, a card that is heavier than a standard plastic card is often desired, as well as an increased durability of the card body. In order to achieve these desired effects, several card constructions utilizing ceramic components are described herein, including exemplary embodiments in the form of: a solid ceramic card, a card containing ceramic inserts, and a card utilizing a ceramic coating.

A solid ceramic card may be created using injection molding to its desired shape followed by sintering to create nominal dimensions of a standard sized card: 3.37"×2.125"× 0.03" (although not limited to any particular size). Pockets may be created in the injection molding process to allow insertion of functional features such as a magnetic stripe, contact or dual interface chip module, a booster antenna for dual interface cards, holograms, signature panel or branding. The ceramic card body may also be created from larger blocks of ceramic and machined to desired size. The ceramic part may also be 3D printed for production. In preferred embodiments, the ceramic may comprise a sintered zirconia dioxide, but may also comprise one or more of the following oxides, without limitation: alumina, beryllia, ceria, ceramide, carbide, boride, nitride or silicide.

A solid ceramic card provides functional advantages to existing premium, metal cards in that it does not have to be significantly machined, does not produce electrostatic discharge, and does not interfere with RF radiation for contactless transactions. Aesthetically, the solid ceramic card may be obtained in a variety of colors by adding pigment to the ceramic compound and may be further changed by laser marking, adding desired features such as a laser signature or decorative design feature. Security elements such as through holes, windows, or microtext may also be added via laser, mechanical, or chemical engraving, or by any method known in the field.

As shown in FIGS. 11B, 11C 11D, and 11E, transaction cards comprising metal-ceramic composites containing metal and ceramic may also be provided. In one embodiment, ceramic inserts may be placed into metal and metal-plastic cards to create unique features and increase the available color, texture, and laser features on the card while maintaining most of the weight of a metal card. For example, such inserts may be attached by milling a pocket in the core, placing an adhesive in the pocket, and adhering the ceramic insert in the pocket. In another embodiment, the ceramic insert and a milled pocket may respectively be configured such that a press fit holds the ceramic insert in place. In still another embodiment, the core may have one or more tapped holes disposed in the edges thereof such that the core serves as a frame, in which set screws disposed in the tapped holes hold the ceramic insert within the frame. The attachment of ceramic inserts to a core, however, is not limited to any particular method.

Metal core cards, with dual and single sided ceramic coatings may also be provided (see FIGS. 11B, 11C, 11D and 11E). The metal core may comprise a solid 0.024" to 0.030" (but not limited to any particular thickness) metal such as but not limited to metals comprising: brass, steel, nickel, palladium, silver, gold, platinum, aluminum or any other suitable metal or metal alloy known to the art. The metal core may also comprise a composite construction, such as a core containing a first metal 0.001"-0.029" thick (although not limited to any particular thickness) bonded to a second metal 0.001"-0.029" thick (although not limited to any particular thickness), or any plurality of layers composing a desired thickness of the card. This composite material may be desired for a specific weight or color that may show when the ceramic is laser marked. Utilizing composite metals may also increase cost efficiency. Metal-plastic composite cards with single and dual sided ceramic coatings may achieve desired manufacturing costs, weights, and artistic effects.

In one exemplary embodiment, a 0.02" thick metal core (such as steel) may be bonded to a 0.007" thick PVC layer on one side with a ceramic coating on the un-bonded surface of the metal core. The ceramic may be applied as a spray coating, which is then thermally, air, or UV cured. After curing, the coating is typically 0.001"-0.003" thick, depending on the desired look of the coating. These coatings may be produced in a variety of colors. Typically, the coating is composed of ceramic microparticles containing zirconia dioxide, aluminum disilicide, and a curable resin binder suspended in a volatile organic carrier solution, such as a CERAKOTE® ceramic coating, manufactured by or on behalf of NIC Industries, Inc. Once sprayed and cured, the coating provides a unique color and texture to the cards along with an extremely durable finish, typically reaching several thousand Taber abrader cycles. The ceramic coating may be modified with mechanical or chemical engraving, inkjet printing, laser marking and other methods known to the art to provide a desired artistic effect, such as to include a design on the card, such as is shown, for example, in FIG. 11E. A magnetic stripe, signature panel, branding, hologram and other functional features of the transactional card may be applied directly to the ceramic surface (see 123, 125, in FIG. 11C), or a pocket may be created (see FIG. 10C), such as by mechanical or laser engraving, to allow such features to bond to the metal core.

Thus, an exemplary method for producing an exemplary ceramic card with a metal core may comprise the following steps:
1. Provide metal core sheet. (Optional—Step of providing the metal core may comprise laminating a metal foil, such as aluminum foil, to one or more surfaces of an inner subcore, in which the subcore may comprise any material, but typically metal or plastic).
2. Add fixturing to metal core, such as adding fixturing holes and fixtures used for holding the sheet in place while the next steps are performed.
3. Create surface features, such as pockets, for example, for holding a booster antenna for use in connection with an RFID chip, which can be disposed below the ceramic layer. Also, pockets in the core may be provided that ultimately result in depressions in the ceramic coating into which later component s (such as the RFID chip) can be attached at the end of processing, to provide for a smooth surface in the final product.
4. Apply surface finish to core (bead blasting, tumbling, brushing, etc.)
5. Coat with ceramic on one or both sides.
6. Laser mark ceramic coated metal sheet with designs or other surface features, and make any other mechanical, chemical, or laser modifications needed to facilitate later attachment of other components. For example, edges of any pockets or depressions may be processed for a better fit of features to be added in a subsequent step or areas where an adhesive is later applied may be roughened for better adhesion.
7. Cut sheet into card blanks, such as using CNC (computer numerical control) machine
8. Apply functional and security features (mag stripe, chip, hologram, etc.) to individual card blanks. As noted above, such features may fit in a pocket created earlier in the process or adhesively attached to an area that has been roughened. The magnetic stripe, however, is preferably applied directly on the ceramic coating, because of the benefits of application onto a surface that is as planar and flat as possible.

In the identification card market, which is traditionally composed of composite plastics or polycarbonate, ceramics offers new possibilities to increase card lifespan and making the cards much more challenging to counterfeit. Colored and clear ceramic coatings may be applied to plastic cores to create significantly more durable materials as tested by ISO standard flexibility and wear testing. Additionally, these materials are much harder to counterfeit and allow for unique laser marking properties as well as inclusion of unique phosphors in the ceramic which can shift incident light up or downfield, creating a unique light "watermark" as part of the ID.

What is claimed is:

1. A method for making a card with a given appearance comprising the steps of:
(a) preparing a decorative metal layer by anodizing a metal layer, then coloring the anodized metal layer with a dye to give the anodized metal layer a given color, and then sealing the colorized decorative metal layer; and
(b) preparing a core metal layer for forming the body of said card, said core layer having first and second surfaces generally parallel to each other, and a core color that differs from the given color of the colorized decorative metal layer;

(c) after performing each of steps (a) and (b), attaching said decorative metal layer to the metal core layer by laminating the layers;

(d) forming a hard coat layer over said decorative metal layer having a color that is different than the core layer and the decorative metal layer;

(e) removing portions of the hard coat layer in a first area to expose the decorative metal layer; and (f) removing portions of the hard coat layer and any intervening layers in a second area different from the first area to expose the core metal layer, (g) electroplating a third area of the decorative metal layer different from the first area and the second area with an electroplating metal having an electroplating color that differs from the given color of the colorized decorative metal layer and the core color of the core metal layer;

such that after performing each of steps (e) through (g), the card has a face displaying the color of the hard coat layer in a fourth area, the core color of the core metal layer in the second area, the electroplating color of the electroplating in the third area, and the given color of the colorized decorative metal layer in the first area.

2. The method as claimed in claim 1, wherein said decorative layer comprises anodized aluminum and further including applying a laser source to said decorative metal layer to modify the card's color, appearance, and texture.

3. The method as claimed in claim 2 further including a polymeric layer attached to the second surface of the core metal layer.

4. The method as claimed in claim 2 further comprising at least one additional layer having a color different from the color of the core metal layer and the decorative layer, the additional layer being a polymeric layer attached to the second surface of the core layer, and an integrated circuit module is located within said card for enabling at least one of: (a) wireless radio frequency (RF) transmission between the card and an external card reader; and (b) contact reading between the card and a contact reader.

5. The method of claim 4, wherein each removing step comprises applying a laser source to the at least one additional layer.

6. The method as claimed in claim 1, wherein said metal decorative layer comprises anodized aluminum, further including the step of applying a laser source to said hard coat layer and to said anodized aluminum layer for modifying at least one of the color and texture of the card.

7. The method as claimed in claim 1 wherein each removing step comprises applying a laser source to remove portions of the card.

8. The method as claimed in claim 1 wherein said step of attaching a decorative layer to said core metal layer includes the step of forming a pocket within a surface of said core metal layer and firmly attaching one of said decorative layers within said pocket.

9. The method as claimed in claim 8 wherein the depth of the pocket is made substantially equal to the thickness of the decorative layer.

10. The method claim as claimed in claim 1, further including the steps of dying the anodized metal layer multiple colors.

11. The method as claimed in claim 1 further including the step of modifying the anodized layer by laser engraving.

12. The method as claimed in claim 1 wherein the anodized metal layer is selectively extended along the surface of the card: (a) the full length and width of the card, (b) as a patch, (c) as a stripe, or (d) as a decorative design.

13. The method as claimed in claim 1 further including the step of attaching a decorative layer to the second surface of the core metal layer.

14. The method as claimed in claim 13 wherein said decorative layer attached to the second surface of the core metal layer includes one of (a) an anodized metal layer, (b) a plant derived material veneer layer; (c) an animal derived material veneer layer; (d) an aggregate binder material veneer layer; (e) a ceramic layer; and (f) a layer of crystal fabric material.

15. The method of claim 1, further comprising printing graphics on the colorized anodized metal of the decorative layer.

16. The method of claim 1, comprising attaching the decorative metal layer to the first surface of the core metal layer.

17. The method of claim 16, comprising attaching the decorative metal layer to the first surface of the core metal layer with a first adhesive layer.

18. The method of claim 1, in which the card comprises a multi-colored anodized metal layer, the decorative metal layer comprises a top sub-layer of the multi-colored anodized metal layer.

19. A card having a front side and a back side, said card comprising:

a core metal layer forming the bulk of the card and having a predetermined color and said core metal layer having first and second surfaces extending generally parallel to each other, a decorative layer disposed over said first surface of said core metal layer for providing at least one of color and texture to the card, said decorative layer comprising a colorized anodized metal layer having a given color different from the predetermined color of the core metal layer, a hard coat layer attached to said decorative layer having a color that is different than the core metal layer and the decorative layer, an opening formed through the hard coat layer for displaying the color of the decorative layer, and a second opening different from the opening formed through the hard coat layer and any intervening layers for displaying the color of the core metal layer, an area of the decorative metal layer different from the opening and the second opening for displaying an electroplating color different from the color of the decorative layer and the color of the core metal layer, wherein the core metal layer and the decorative layer are laminated together, and the colors of the hard coat layer, the decorative layer, the electroplated area, and the core metal layer are visible from the front side of the card.

20. The card as claimed in claim 19 wherein said decorative layer comprises an anodized aluminum layer that is a product of a process comprising anodizing a metal layer, then coloring the anodized metal layer with a dye to give the anodized metal layer the given color, and then sealing the colorized anodized metal layer.

21. The card as claimed in claim 19, further comprising at least one additional layer having a color different from the color of the core metal layer and the decorative layer, the additional layer being attached to the core metal layer and a pattern is formed within said hard coat layer and said anodized aluminum layer and said core metal layer producing a pattern which displays the colors of said hard coat layer, said anodized aluminum layer, said core metal layer and said additional layer.

22. The card as claimed in claim 21, wherein said anodized metal layer comprises a multi-colored metal layer, the decorative layer comprises one sub-layer of the multi-colored metal layer and the additional layer comprises another sub-layer of the multi-colored metal layer.

23. The card as claimed in claim 19, further comprising at least one additional layer having a color different from the color of the core metal layer and the decorative layer, the additional layer being a polymeric layer that is attached to the second surface of the core metal layer.

24. The card as claimed in claim 19, further comprising at least one additional layer having a color different from the color of the core metal layer and the decorative layer, the additional layer being a polymeric layer attached to the core metal layer, and further including an integrated circuit module located within said card for enabling at least one of: (i) wireless radio frequency (RF) transmission between the card and an external card reader; and (ii) contact reading between the card and a contact reader.

25. The card as claimed in claim 19, said card having an appearance that is a function of the colors of the layers and in which the texture is a function of the pattern formed.

26. The card as claimed in claim 19 wherein said decorative layer attached to the first surface of said core metal layer is a first decorative layer; and wherein a second decorative layer is attached to the second surface of said core metal layer.

27. The card as claimed in claim 26 wherein said second decorative layer is one of: (a) an anodized metal layer, (b) a plant derived material veneer layer; (c) an animal derived material veneer layer; and (d) an aggregate binder material veneer layer; (e) a ceramic layer; and (f) a layer of crystal fabric material.

28. The card as claimed in claim 26 wherein the decorative layer attached to the first surface of said core metal layer is different than the decorative layer attached to the second surface of said core metal layer.

29. The card as claimed in claim 26 wherein the second decorative layer comprises an anodized metal foil and further includes a signal panel and a magnetic stripe attached to the second decorative layer.

30. The card as claimed in claim 26 wherein the second decorative layer comprises an anodized metal foil and further includes:
 a polymer layer attached to the second decorative layer, and
 a signal panel and a magnetic stripe attached to the polymer layer.

31. The card claimed in claim 19 wherein a pocket is formed in the first surface of said core metal layer and wherein a decorative layer is attached to the core metal layer within the pocket.

32. The card as claimed in claim 31, wherein the decorative layer attached to the core metal layer within the pocket is a layer of crystal fabric material.

33. The card of claim 19, further comprising graphics printed on the colorized anodized metal layer.

\* \* \* \* \*